United States Patent
Susanu et al.

(10) Patent No.: US 8,264,576 B2
(45) Date of Patent: Sep. 11, 2012

(54) RGBW SENSOR ARRAY

(75) Inventors: George Susanu, Headford (IE); Stefan Petrescu, Bucharest (RO); Florin Nanu, Bucharest (RO); Adrian Capata, Bucharest (RO); Peter Corcoran, Claregalway (IE)

(73) Assignee: DigitalOptics Corporation Europe Limited, Galway (IE)

( * ) Notice: Subject to any disclaimer, the term of this patent is extended or adjusted under 35 U.S.C. 154(b) by 398 days.

(21) Appl. No.: 12/330,719

(22) Filed: Dec. 9, 2008

(65) Prior Publication Data

US 2009/0167893 A1    Jul. 2, 2009

Related U.S. Application Data

(63) Continuation-in-part of application No. 11/856,721, filed on Sep. 18, 2007.

(60) Provisional application No. 60/893,116, filed on Mar. 5, 2007.

(51) Int. Cl.
    *H04N 3/14* (2006.01)
(52) U.S. Cl. ...................................... 348/272
(58) Field of Classification Search ............ 347/272
    See application file for complete search history.

(56) References Cited

U.S. PATENT DOCUMENTS

| | | |
|---|---|---|
| 5,251,019 A | 10/1993 | Moorman et al. |
| 5,374,956 A | 12/1994 | D'luna |
| 5,392,088 A | 2/1995 | Abe et al. |
| 5,428,723 A | 6/1995 | Ainscow et al. |
| 5,510,215 A | 4/1996 | Prince et al. |
| 5,599,766 A | 2/1997 | Boroson et al. |
| 5,686,383 A | 11/1997 | Long et al. |
| 5,747,199 A | 5/1998 | Roberts et al. |
| 5,751,836 A | 5/1998 | Wildes et al. |
| 5,756,239 A | 5/1998 | Wake |
| 5,756,240 A | 5/1998 | Roberts et al. |
| 5,802,220 A | 9/1998 | Black et al. |
| 5,889,277 A | 3/1999 | Hawkins et al. |
| 5,889,554 A | 3/1999 | Mutze |
| 5,909,242 A | 6/1999 | Kobayashi et al. |
| 5,981,112 A | 11/1999 | Roberts |
| 6,028,960 A | 2/2000 | Graf et al. |
| 6,035,072 A | 3/2000 | Read |
| 6,041,078 A | 3/2000 | Rao |

(Continued)

FOREIGN PATENT DOCUMENTS

DE    3729324 A1    3/1989

(Continued)

OTHER PUBLICATIONS

Andrews. H.C. et al., "Digital Image Restoration", Prentice Hall, 1977.

(Continued)

*Primary Examiner* — James Hannett
(74) *Attorney, Agent, or Firm* — Andrew V. Smith

(57) ABSTRACT

A color filter enhancement method for a portable digital image acquisition device includes digitally exposing color pixels of a color sensor array for a first digital exposure duration and digitally exposing white pixels of a color sensor array for a second digital exposure time shorter than the first digital exposure duration. A color filter enhanced digital image is generated using data from both the color pixels exposed for the first digital exposure duration and the white pixels exposed for the second digital exposure duration.

27 Claims, 13 Drawing Sheets

U.S. PATENT DOCUMENTS

| | | |
|---|---|---|
| 6,061,462 A | 5/2000 | Tostevin et al. |
| 6,081,606 A | 6/2000 | Hansen et al. |
| 6,114,075 A | 9/2000 | Long et al. |
| 6,122,017 A | 9/2000 | Taubman |
| 6,124,864 A | 9/2000 | Madden et al. |
| 6,134,339 A | 10/2000 | Luo |
| 6,269,175 B1 | 7/2001 | Hanna et al. |
| 6,297,071 B1 | 10/2001 | Wake |
| 6,297,846 B1 | 10/2001 | Edanami |
| 6,326,108 B2 | 12/2001 | Simons |
| 6,330,029 B1 | 12/2001 | Hamilton et al. |
| 6,360,003 B1 | 3/2002 | Doi et al. |
| 6,365,304 B2 | 4/2002 | Simons |
| 6,381,279 B1 | 4/2002 | Taubman |
| 6,387,577 B2 | 5/2002 | Simons |
| 6,407,777 B1 | 6/2002 | DeLuca |
| 6,535,244 B1 | 3/2003 | Lee et al. |
| 6,555,278 B1 | 4/2003 | Loveridge et al. |
| 6,567,536 B2 | 5/2003 | McNitt et al. |
| 6,599,668 B2 | 7/2003 | Chari et al. |
| 6,602,656 B1 | 8/2003 | Shore et al. |
| 6,607,873 B2 | 8/2003 | Chari et al. |
| 6,618,491 B1 | 9/2003 | Abe |
| 6,625,396 B2 | 9/2003 | Sato |
| 6,643,387 B1 | 11/2003 | Sethuraman et al. |
| 6,741,960 B2 | 5/2004 | Kim et al. |
| 6,863,368 B2 | 3/2005 | Sadasivan et al. |
| 6,892,029 B2 | 5/2005 | Tsuchida et al. |
| 6,947,609 B2 | 9/2005 | Seeger et al. |
| 6,961,518 B2 | 11/2005 | Suzuki |
| 7,019,331 B2 | 3/2006 | Winters et al. |
| 7,072,525 B1 | 7/2006 | Covell |
| 7,084,037 B2 | 8/2006 | Gamo et al. |
| 7,160,573 B2 | 1/2007 | Sadasivan et al. |
| 7,177,538 B2 | 2/2007 | Sato et al. |
| 7,180,238 B2 | 2/2007 | Winters |
| 7,195,848 B2 | 3/2007 | Roberts |
| 7,292,270 B2 | 11/2007 | Higurashi et al. |
| 7,315,324 B2 | 1/2008 | Cleveland et al. |
| 7,315,630 B2 | 1/2008 | Steinberg et al. |
| 7,315,631 B1 | 1/2008 | Corcoran et al. |
| 7,316,630 B2 | 1/2008 | Tsukada et al. |
| 7,316,631 B2 | 1/2008 | Tsunekawa |
| 7,317,815 B2 | 1/2008 | Steinberg et al. |
| 7,336,821 B2 | 2/2008 | Ciuc et al. |
| 7,369,712 B2 | 5/2008 | Steinberg et al. |
| 7,403,643 B2 | 7/2008 | Ianculescu et al. |
| 7,453,493 B2 | 11/2008 | Pilu |
| 7,453,510 B2 | 11/2008 | Kolehmainen et al. |
| 7,460,695 B2 | 12/2008 | Steinberg et al. |
| 7,469,071 B2 | 12/2008 | Drimbarean et al. |
| 7,489,341 B2 | 2/2009 | Yang et al. |
| 7,548,256 B2 | 6/2009 | Pilu |
| 7,551,755 B1 | 6/2009 | Steinberg et al. |
| 7,565,030 B2 | 7/2009 | Steinberg et al. |
| 7,593,144 B2 | 9/2009 | Dymetman |
| 7,623,153 B2 | 11/2009 | Hatanaka |
| 7,692,696 B2 | 4/2010 | Steinberg et al. |
| 2001/0036307 A1 | 11/2001 | Hanna et al. |
| 2002/0006163 A1 | 1/2002 | Hibi et al. |
| 2003/0052991 A1 | 3/2003 | Stavely et al. |
| 2003/0058361 A1 | 3/2003 | Yang |
| 2003/0091225 A1 | 5/2003 | Chen |
| 2003/0103076 A1 | 6/2003 | Neuman |
| 2003/0151674 A1 | 8/2003 | Lin |
| 2003/0152271 A1 | 8/2003 | Tsujino et al. |
| 2003/0169818 A1 | 9/2003 | Obrador |
| 2003/0193699 A1 | 10/2003 | Tay |
| 2003/0219172 A1 | 11/2003 | Caviedes et al. |
| 2004/0066981 A1 | 4/2004 | Li et al. |
| 2004/0076335 A1 | 4/2004 | Kim |
| 2004/0090532 A1 | 5/2004 | Imada |
| 2004/0120598 A1 | 6/2004 | Feng |
| 2004/0120698 A1 | 6/2004 | Hunter |
| 2004/0130628 A1 | 7/2004 | Stavely |
| 2004/0145659 A1 | 7/2004 | Someya et al. |
| 2004/0169767 A1 | 9/2004 | Norita et al. |
| 2004/0212699 A1 | 10/2004 | Molgaard |
| 2004/0218057 A1 | 11/2004 | Yost et al. |
| 2004/0218067 A1 | 11/2004 | Chen et al. |
| 2004/0247179 A1 | 12/2004 | Miwa et al. |
| 2005/0010108 A1 | 1/2005 | Rahn et al. |
| 2005/0019000 A1 | 1/2005 | Lim et al. |
| 2005/0031224 A1 | 2/2005 | Prilutsky et al. |
| 2005/0041121 A1 | 2/2005 | Steinberg et al. |
| 2005/0041123 A1 | 2/2005 | Ansari et al. |
| 2005/0047672 A1 | 3/2005 | Ben-Ezra et al. |
| 2005/0052553 A1 | 3/2005 | Kido et al. |
| 2005/0057687 A1 | 3/2005 | Irani et al. |
| 2005/0068446 A1 | 3/2005 | Steinberg et al. |
| 2005/0068452 A1 | 3/2005 | Steinberg et al. |
| 2005/0140801 A1 | 6/2005 | Prilutsky et al. |
| 2005/0140829 A1 | 6/2005 | Uchida et al. |
| 2005/0201637 A1 | 9/2005 | Schuler et al. |
| 2005/0219391 A1 | 10/2005 | Sun et al. |
| 2005/0231625 A1 | 10/2005 | Parulski et al. |
| 2005/0248660 A1 | 11/2005 | Stavely et al. |
| 2005/0259864 A1 | 11/2005 | Dickinson et al. |
| 2005/0270381 A1 | 12/2005 | Owens et al. |
| 2005/0281477 A1 | 12/2005 | Shiraki et al. |
| 2006/0006309 A1 | 1/2006 | Dimsdale et al. |
| 2006/0017837 A1 | 1/2006 | Sorek et al. |
| 2006/0038891 A1 | 2/2006 | Okutomi et al. |
| 2006/0039690 A1 | 2/2006 | Steinberg et al. |
| 2006/0093212 A1 | 5/2006 | Steinberg et al. |
| 2006/0098237 A1 | 5/2006 | Steinberg et al. |
| 2006/0098890 A1 | 5/2006 | Steinberg et al. |
| 2006/0098891 A1 | 5/2006 | Steinberg et al. |
| 2006/0119710 A1 | 6/2006 | Ben-Ezra et al. |
| 2006/0120599 A1 | 6/2006 | Steinberg et al. |
| 2006/0125938 A1 | 6/2006 | Ben-Ezra et al. |
| 2006/0133688 A1 | 6/2006 | Kang et al. |
| 2006/0140455 A1 | 6/2006 | Costache et al. |
| 2006/0170786 A1 | 8/2006 | Won |
| 2006/0171464 A1 | 8/2006 | Ha |
| 2006/0187308 A1 | 8/2006 | Lim et al. |
| 2006/0204034 A1 | 9/2006 | Steinberg et al. |
| 2006/0204054 A1 | 9/2006 | Steinberg et al. |
| 2006/0204110 A1 | 9/2006 | Steinberg et al. |
| 2006/0285754 A1 | 12/2006 | Steinberg et al. |
| 2007/0025714 A1 | 2/2007 | Shiraki |
| 2007/0058073 A1 | 3/2007 | Steinberg et al. |
| 2007/0083114 A1 | 4/2007 | Yang et al. |
| 2007/0086675 A1 | 4/2007 | Chinen et al. |
| 2007/0097221 A1 | 5/2007 | Stavely et al. |
| 2007/0110305 A1 | 5/2007 | Corcoran et al. |
| 2007/0147820 A1 | 6/2007 | Steinberg et al. |
| 2007/0189748 A1 | 8/2007 | Drimbarean et al. |
| 2007/0201724 A1 | 8/2007 | Steinberg et al. |
| 2007/0234779 A1 | 10/2007 | Hsu et al. |
| 2007/0269108 A1 | 11/2007 | Steinberg et al. |
| 2007/0296833 A1 | 12/2007 | Corcoran et al. |
| 2008/0012969 A1 | 1/2008 | Kasai et al. |
| 2008/0037827 A1 | 2/2008 | Corcoran et al. |
| 2008/0037839 A1 | 2/2008 | Corcoran et al. |
| 2008/0037840 A1 | 2/2008 | Steinberg et al. |
| 2008/0043121 A1 | 2/2008 | Prilutsky et al. |
| 2008/0175481 A1 | 7/2008 | Petrescu et al. |
| 2008/0211943 A1 | 9/2008 | Egawa et al. |
| 2008/0218611 A1 | 9/2008 | Parulski et al. |
| 2008/0219581 A1 | 9/2008 | Albu et al. |
| 2008/0219585 A1 | 9/2008 | Kasai et al. |
| 2008/0220750 A1 | 9/2008 | Steinberg et al. |
| 2008/0231713 A1 | 9/2008 | Florea et al. |
| 2008/0232711 A1 | 9/2008 | Prilutsky et al. |
| 2008/0240555 A1 | 10/2008 | Nanu et al. |
| 2008/0292193 A1 | 11/2008 | Bigioi et al. |
| 2008/0309769 A1 | 12/2008 | Albu et al. |
| 2008/0309770 A1 | 12/2008 | Florea et al. |
| 2009/0003652 A1 | 1/2009 | Steinberg et al. |
| 2009/0009612 A1 | 1/2009 | Tico et al. |
| 2009/0080713 A1 | 3/2009 | Bigioi et al. |
| 2009/0080796 A1 | 3/2009 | Capata et al. |
| 2009/0080797 A1 | 3/2009 | Nanu et al. |
| 2009/0167893 A1 | 7/2009 | Susanu et al. |
| 2009/0179999 A1 | 7/2009 | Albu et al. |
| 2009/0185041 A1* | 7/2009 | Kang et al. ............... 348/208.1 |

| | | | |
|---|---|---|---|
| 2009/0185753 | A1 | 7/2009 | Albu et al. |
| 2009/0190803 | A1 | 7/2009 | Neghina et al. |
| 2009/0196466 | A1 | 8/2009 | Capata et al. |
| 2009/0263022 | A1 | 10/2009 | Petrescu et al. |
| 2009/0273685 | A1 | 11/2009 | Ciuc et al. |
| 2009/0303342 | A1 | 12/2009 | Corcoran et al. |
| 2009/0303343 | A1 | 12/2009 | Drimbarean et al. |
| 2010/0126831 | A1 | 5/2010 | Ceelen |

FOREIGN PATENT DOCUMENTS

| | | |
|---|---|---|
| DE | 10154203 A1 | 6/2002 |
| DE | 10107004 A1 | 9/2002 |
| EP | 0 944 251 A1 | 9/1999 |
| EP | 944251 B1 | 4/2003 |
| EP | 1583033 A2 | 10/2005 |
| EP | 1779322 B1 | 1/2008 |
| EP | 1429290 B1 | 7/2008 |
| JP | 10285542 A2 | 10/1998 |
| JP | 11327024 A2 | 11/1999 |
| JP | 2008-520117 T | 6/2008 |
| WO | WO-9843436 A1 | 10/1998 |
| WO | WO 01/13171 A1 | 2/2001 |
| WO | WO-0245603 A1 | 6/2002 |
| WO | WO-03071484 A1 | 8/2003 |
| WO | WO-04001667 A2 | 12/2003 |
| WO | WO-2004036378 A2 | 4/2004 |
| WO | WO-2006050782 A1 | 5/2006 |
| WO | WO2007093199 A2 | 8/2007 |
| WO | WO2007093199 A3 | 8/2007 |
| WO | WO2007142621 A1 | 12/2007 |
| WO | WO-2007143415 A2 | 12/2007 |
| WO | WO2008017343 A1 | 2/2008 |
| WO | WO2008131438 A2 | 10/2008 |
| WO | WO 2008/151802 A1 | 12/2008 |
| WO | WO2009036793 A1 | 3/2009 |
| WO | WO 2010/066381 A1 | 6/2010 |

OTHER PUBLICATIONS

Bates et al., "Some Implications of Zero Sheets for Blind Deconvolution and Phase Retrieval.", J. Optical Soc. Am. A. 1990, pp. 468-479, vol. 7.
Ben Ezra, Moshe et al., "Motion Deblurring Using Hybrid Imaging", Proceedings IEEE Computer Society Conference on Computer Vision and Pattern Recognition, 2003.
Ben-Ezra, M. el al., "Motion-Based Motion Deblurring", IEEE Transactions on Pattern Analysis and Machine Intelligence, 2004, pp. 689-698, vol. 26—Issue 6.
Bennett, Eric P. et al., "Video Enhancement Using Per-Pixel Virtual Exposures", International Conference on Computer Graphics and Interactive Techniques ACM Siggraph, 2005, pp. 845-852.
Bhaskaran, V. et al., "Motion estimation using a computation-constrained criterion", Digital Signal Processing Proceedings, 1997, pp. 229-232, vol. 1.
Bones et al., "Deconvolution and Phase Retrieval With Use of Zero Sheets", J. Optical Soc. Am. A, 1995, pp. 1,842-1,857, vol. 12.
Chen-Kuei Y. et al., "Color image sharpening by moment-preserving technique", Signal Processing, 1995, pp. 397-403, vol. 45—Issue 3, Elsevier Science Publishers.
Crowley, J. et al., "Multi-modal tracking of faces for video communication, http://citeseer.ist.psu.edu/crowley97multimodal.html.", In Computer Vision and Patent Recognition, 1997.
Deever, A., "In-camera all-digital video stabilization", Proceedings of the International Conference on Decision Support Systems Proceedings of ISDSS, 2006, pp. 190-193.
Demir, B. et al., "Block motion estimation using adaptive modified two-bit transform", 2007, pp. 215-222, vol. 1—Issue 2.
Dufournaud et al., "Matching images With Different Resolutions", IEEE Conference Proceedings on Computer Vision and Pattern Recognition, 2000.
Elad et al., "Restoration of a Single Superresolution Image from several Blurred, Noisy and Undersampled Measured Images", IEEE Trans. on Image Processing, 1997, vol. 6—Issue 12.
Elad, Michael et al., "Superresolution Restoration of an Image Sequence: Adaptive Filtering Approach", IEEE Transactions on Image Processing, 1999, pp. 529-541. vol. 8—Issue 3.

Favaro, Paolo, "Depth from focus/defocus, http://homepages.inf.ed.ac.uk/rbf/Cvonline/LOCAL COPIES/FAVARO1/dfdtutorial.html.", 2002.
Feng, J. et al., "Adaptive block matching motion estimation algorithm using bit plane matching", ICIP, 1995, pp. 496-499.
Fujita K. et al., An edge-adaptive iterative method for image restoration, Singapore ICCS/ISITA '92. "Communications on the Move" Singapore Nov. 16-20, 1992, New York, NY, USA, IEEE, US, Nov. 16, 1992,pp. 361-365, XP010066997, ISBN: 0-7803-0803-4.
Jansson, Peter A., "Chapter 1: Convolution and Related Concepts", Deconvolution of Images and Spectra, 1997, 2nd. Edition, Academic Press.
Jiang, Wei et al., "Dense Panoramic Imaging and 3D Reconstruction by Sensors Fusion, http://rlinks2.dialog.com/NASApp/ChannelWEB/DialogProServlet?ChName=engineering", Japan Sci. and Technol. Agency, JPN(JST); National Inst. Industrial Safety, JPN Nippon Kikai Gakkai Robotikusu, Mekatoronikusu Koenkai Koen Ronbunshu (CD-ROM), 2006, pp. 2P1-C15.
Ko, S. et al., "Fast digital image stabilizer based on gray-coded bit-plane matchineg", IEEE Transactions on Consumer Electronics, 1999, pp. 598-603, vol. 45—Issue 3.
Lane et al., "Automatic multidimensional deconvolution", J. Opt. Soc. Am. A, 1987, pp. 180-188, vol. 4—Issue 1.
Lhuillier, M. et al., "A quasi-dense approach to surface reconstruction from uncalibrated images, http://rlinks2.dialog.com/NASApp/ChannelWEB/DialogProServlet?ChName=engineering", IEEE Transactions on Pattern Analysis and Machine Intelligence, 2005, pp. 418-433, vol. 27—Issue 3, IEEE Comput. Soc.
Mase, Mitsuhito et al., "A Wide Dynamic Range CMOS image Sensor with Multiple Exposure-Time Signal Outputs and 12-bit Column-Parallel Cyclic A/D Converters", IEEE Journal of Solid-State Circuits, 2005, vol. 40—Issue 12.
Natarajan B. et al., "Low-complexity block-based motion estimation via one-bit transforms", IEEE Trans. Circuit Syst. Video Technol, 1997, pp. 702-706. vol. 7—Issue 5.
Oppenheim, A.V. et al, "The Importance of Phase in Signals, XP008060042, ISSN: 0018-9219.", Proceedings of the IEEE, 1981, pp. 529-541, vol. 69—Issue 5.
Park, Sung Cheol et al., "Super-resolution image reconstruction: a technical overview, ISSN: 1053-5888. DOI: 10.1109/MSP.2003.1203207.", Signal Processing Magazine, 2003, pp. 21-36, vol. 20—Issue 3, IEEE Publication.
Patti A. et al., "Super-Resolution video reconstruction with arbitrary sampling lattices and non-zero aperture time http://citeseer.ist.psu.edu/patti97super.html", In IEEE Transactions on Image Processing, 1997, pp. 1064-1078.
PCT International Preliminary Report on Patentability, for PCT Application No. PCT/EP2005/011011, dated Jan. 22, 2007, 8 pages.
PCT Notification of Transmittal of the International Search Report and the Written Opinion of the International Searching Authority, or the Declaration, for PCT application No. PCT/US2007/069638, dated Mar. 5, 2008, 9 pages.
PCT Notification of Transmittal of the International Search Report and the Written Opinion of the International Searching Authority, or the Declaration, for PCT Application No. PCT/EP2005/011011, dated Apr. 24, 2006, 12 pages.
PCT Notification of Transmittal of the international Search Report and the Written Opinion of the International Searching Authority, or the Declaration, for PCT Application No. PCT/EP2007/009939, dated May 21, 2008, 13 pages.
PCT Notification o1 Transmittal of the International Search Report and the Written Opinion of the International Searching Authority, or the Declaration, for PCT Application No. PCT/EP2008/004729, dated Oct. 29, 2008, 9 pages.
Pulli, Kari et al., "Robust Meshes from Multiple Range Maps, http://citeseer.ist.psu.edu/pulli97robust,html", In Proc. IEEE International Conference on Recent Advances in 3-D Digital Imaging and Modeling, 1997.
Rahgozar et al., "Motion Estimation Based on Time-Sequentially Sampled Imagery", IEEE Transactions on Image Processing, 1995.
Rav-Acha, A. et al., "Restoration of Multiple Images with Motion Blur in Different Directions, XP002375829, ISBN: 0-7695-0813-8", Proceedings Fifth IEEE Workshop on Applications on Computer Vision IEEE Comput. Soc, 2000, pp. 22-28.

Sasaki et al., "A wide Dynamic Range CMOS Image Sensor with Multiple Short-Time Exposures", IEEE Proceedings on Sensors, 2004, pp. 967-972 vol. 2.

Sauer, K. et al., "Efficient Block Motion Estimation Using Integral Projections", IEEE Trans. Circuits, Systems for video Tech, 1996, pp. 513-518, vol. 6—Issue 5.

Schultz, Richard R. et al., "Extraction of High-Resolution Frames from Video Sequences, http://citeseer.ist.psu.edu/schultz96extraction.html", IEEE transactions on image processing, 1996, pp. 996-1011.

Seldin et al., "Iterative blind deconvolution algorithm applied to phase retrieval", J. Opt. Soc. Am. A, 1990, pp. 428-433. vol. 7—Issue 3.

She, Peng et al., "Motion View Reconstruction Method with Real Object Image based on Virtual Obj. Movement, http://rlinks2,dialog.com/NASApp/ChannelWEB/DialogProServlet?ChName=engineering", Eizo Joho Media Gakkai Gijutsu Hokoku, 2005, pp. 67-70, vol. 29—Issue 17.

Siu, Angus et al., "Image registration for image-based rendering, http://rlinks2.diaglog.com/NASApp/ChannelWEB/DialogProServlet?ChName=engineering", IEEE Transactions on Image Processing, 2005, pp. 241-252, vol. 14—Issue 2.

Trussell, H.J. et al., "Identification and restoration of spatially variant motion blurs in sequential images, XP002375828", IEEE Transactions on Image Processing, 1992, pp. 123-126, vol. 1—Issue 1.

Uomori, K. et al., "Automatic image stabilizing system by fulldigital signal processing" IEEE Transactions on Consumer Electronics, 1990, vol. 6, No. 3, pp. 510-519.

Zhang, Junping et al., "Change detection for the urban area based on multiple sensor information fusion, http://rlink.s2.dialog.com/NASApp/ChannelWEB/DialogProServlet?ChName=engineering", IEEE International Geoscience and Remote Sensing Symposium, 2005, p. 4, IEEE.

Cannon M., "Blind Deconvolution of Spatially Invariant Image Blurs with Phase," IEEE Transactions on Acoustics, Speech, and Signal Processing, 1976, vol. ASSP-24, No. 1.

Deller J. et al., "Discrete-Time Processing of Speech Signals," 1999, 2nd. Edition, Wiley-IEEE Press.

Deller, John R. Jr et al., "Discrete-Time Processing of Speech Signals", 1993, 908 pages, IEEE Press Classic Reissue (Hardcover).

Deng G. et al., "The study of logarithmic image processing model and its application to image enhancement," IEEE Trans. on Image Processing, 1995, pp. 506-512, vol. 4.

Final Office Action mailed May. 27, 2010, for U.S. Appl. No. 11/753,098, filed May 24, 2007.

Final Office Action mailed Nov. 5, 2008, for U.S. Appl. No. 10/986,562, filed Nov. 10, 2004.

Final Office Action mailed Nov. 13, 2008, for U.S. Appl. No. 10/985,657, filed Nov. 10, 2004.

Final Office Action mailed Nov. 13, 2008, for U.S. Appl. No. 11/566,180, filed Dec. 1, 2006.

Final Office Action mailed Nov. 24, 2008, for U.S. Appl. No. 10/985,650, filed Nov. 10, 2004.

Golub G. H. et al., "Matrix Computations," 1996, 3rd edition, John Hopkins University Press, Baltimore.

Gunturk et al., "High-Resolution Image Reconstruction from Multiple Differently Exposed Images," IEEE Signal Processing Letters, 2006, vol. 13, No. 4.

Hayes M., "Statistical Digital Signal Processing and Modeling," 1996, Wiley.

Haykin S., "Adaptive filter theory," 1996, Prentice Hall.

Jannson, Peter A., "Deconvolution of Images and Spectra," 1997, 2nd. Edition, Academic Press.

Jourlin M. et al., "Logarithmic image processing the mathematical and physical framework for the representation and processing of transmitted images," Advances in Imaging and Electron Physics, 2001, pp. 129-196, vol. 115.

Kuglin C. D. et al., "The phase correlation image alignment method," Proc. Int. Conf. Cybernetics and Society, 1975, pp. 163-165, IEEE, Bucharest, Romania.

Lagendijk R. L. et al., "Iterative Identification and Restoration of Images," 1991, Kluwer Academic.

Non-Final Office Action mailed Apr. 3, 2008, for U.S. Appl. No. 10/985,650, filed Nov. 10, 2004.

Non-Final Office Action mailed Apr. 4, 2008, for U.S. Appl. No. 10/986,562, filed Nov. 10, 2004.

Non-Final Office Action mailed Apr. 21, 2009, for U.S. Appl. No. 10/985,650, filed Nov. 10, 2004.

Non-Final Office Action mailed Apr. 22, 2009, for U.S. Appl. No. 10/986,562, filed Nov. 10, 2004.

Non-Final Office Action mailed Jan. 20, 2010, for U.S. Appl. No. 11/690,836, filed Mar. 25, 2007.

Non-Final Office Action mailed Jun. 1, 2009, for U.S. Appl. No. 10/985,657, filed Nov. 10, 2004.

Non-Final Office Action mailed Jun. 10, 2009, for U.S. Appl. No. 11/566,180, filed Dec. 1, 2006.

Non-Final Office Action mailed Mar. 18, 2008, for U.S. Appl. No. 10/985,657, filed Nov. 10, 2004.

Non-Final Office Action mailed Mar. 21, 2008, for U.S. Appl. No. 11/566,180, filed Dec. 1, 2006.

Non-Final Office Action mailed May 11, 2009, for U.S. Appl. No. 12/199,680, filed Aug. 27, 2008.

Non-Final Office Action mailed May 29, 2009, for U.S. Appl. No. 12/199,710, filed Aug. 27, 2008.

Non-Final Office Action mailed Nov. 4, 2009, for U.S. Appl. No. 11/753,098, filed May 24, 2007.

Notice of Allowance mailed Apr. 29, 2010, for U.S. Appl. No. 11/690,836, filed Mar. 25, 2007.

Notice of Allowance mailed Dec. 1, 2009, for U.S. Appl. No. 12/199,680, filed Aug. 27, 2008.

Notice of Allowance mailed Dec. 11, 2009, for U.S. Appl. No. 12/199,710, filed Aug. 27, 2008.

Notice of Allowance mailed Nov. 2, 2009, for U.S. Appl. No. 10/985,657, filed Nov. 10, 2004.

Notice of Allowance mailed Nov. 17, 2009, for U.S. Appl. No. 11/566,180, filed Dec. 1, 2006.

Notice of Allowance mailed Oct. 29, 2009, for U.S. Appl. No. 10/985,650, filed Nov. 10, 2004.

Notice of Allowance mailed Oct. 29, 2009, for U.S. Appl. No. 10/986,562, filed Nov. 10, 2004.

PCT International Preliminary Report on Patentability for PCT Application PCT/US2007/069638, dated Dec. 10, 2008, 5 pages.

PCT Notification of Transmittal of the International Search Report and the Written Opinion of the International Searching Authority, or the Declaration for PCT application No. PCT/EP2009/008674, dated Mar. 29, 2010, 10 pages.

PCT Written Opinion of the International Preliminary Examining Authority, PCT/EP2005/011011, dated Oct. 24, 2006, 4 pages.

Pickup, Lyndsey et al., "Optimizing and Learning for Super-resolution," BMVC, Sep. 4-7, 2006.

Yuan, Lu et al., "Image Deblurring with Blurred/Noisy Image Pairs," SIGGRAPH07, Aug. 5-9, 2007.

Zitova, Barbara et al., "Image registration methods: a survey," Image and Vision Computing, 2003, pp. 977-1000, vol. 21.

Co-pending U.S. Appl. No. 10/764,339, filed Jan. 22, 2004.
Co-pending U.S. Appl. No. 10/985,650, filed Nov. 10, 2004.
Co-pending U.S. Appl. No. 11/319,766, filed Dec. 27, 2005.
Co-pending U.S. Appl. No. 11/421,027, filed May 30, 2006.
Co-pending U.S. Appl. No. 11/673,560, filed Feb. 10, 2007.
Co-pending U.S. Appl. No. 11/744,020, filed May 3, 2007.
Co-pending U.S. Appl. No. 11/752,925, filed May 24, 2007.
Co-pending U.S. Appl. No. 11/753,098, filed May 24, 2007.
Co-pending U.S. Appl. No. 11/856,721, filed Sep. 18, 2007.
Co-pending U.S. Appl. No. 11/861,257, filed Sep. 25, 2007.
Co-pending U.S. Appl. No. 11/861,854, filed Jun. 26, 2007.
Co-pending U.S. Appl. No. 12/026,484, filed Feb. 5, 2008.
Co-pending U.S. Appl. No. 12/042,104, filed Mar. 4, 2008.
Co-pending U.S. Appl. No. 12/042,335, filed Mar. 5, 2008.
Co-pending U.S. Appl. No. 12/116,140, filed May 6, 2008.
Co-pending U.S. Appl. No. 12/137,113, filed Jun. 11, 2008.
Co-pending U.S. Appl. No. 12/336,416, filed Dec. 16, 2008.
Co-pending U.S. Appl. No. 12/354,707, filed Jan. 15, 2009.

Final Office Action mailed Jul. 8, 2011 for U.S. Appl. No. 12/137,113, filed Jun. 11, 2008.
Final Office Action mailed Jul. 18, 2011 for U.S. Appl. No. 12/755,338, filed Apr. 6, 2010.
Final Office Action mailed Apr. 25, 2011, for U.S. Appl. No. 11/856,721, filed Sep. 18, 2007.
Final Office Action mailed Mar. 25, 2011, for U.S. Appl. No. 11/764,578, filed Jun. 18, 2007.
Non-Final Office Action mailed Mar. 21, 2011, for U.S. Appl. No. 12/702,092, filed Feb. 8, 2010.
Non-Final Office Action mailed Apr. 8, 2011, for U.S. Appl. No. 12/901,577, filed Oct. 11, 2010.
Non-Final Office Action mailed Dec. 7, 2010, for U.S. Appl. No. 11/764,578, filed Jun. 18, 2007.
Non-Final Office Action mailed Jan. 21, 2011, for U.S. Appl. No. 12/137,113, filed Jun. 11, 2008.
PCT International Preliminary Report on Patentability, Chapter I, for PCT Application No. PCT/EP2009/008674, dated Jun. 14, 2011, 7 pages.
PCT International Preliminary Report on Patentability, Chapter I (IB/373), for PCT Application No. PCT/EP2008/004729, dated Dec. 17, 2009, 10 pages.
PCT Notification of the Transmittal of the International Preliminary Report on Patentability, Chapter II, for PCT Application No. PCT/EP2007/009939, dated Nov. 16, 2009, 12 pages.
PCT Notification of the Transmittal of the International Search Report and the Written Opinion of the International Searching Authority, or the Declaration, for PCT Application No. PCT/EP2007/009939, dated May 21, 2008, 13 pages.
PCT Notification of the Transmittal of the International Search Report and the Written Opinion of the International Searching Authority, or the Declaration, for PCT Application No. PCT/EP2008/004729, dated Oct. 29, 2008, 14 pages.
PCT Notification of the Transmittal of the International Search Report and the Written Opinion of the International Searching Authority, or the Declaration, for PCT Application No. PCT/US2007/069638, dated Mar. 5, 2008, 7 pages.
PCT Notification of the Transmittal of the International Search Report and the Written Opinion of the International Searching Authority, or the Declaration, for PCT Application No. PCT/EP2005/011011, dated Apr. 24, 2006, 12 pages.
PCT Notification of the Transmittal of the International Search Report and the Written Opinion of the International Searching Authority, or the Declaration, for PCT Application No. PCT/EP2010/056999, dated Sep. 1, 2010, 10 pages.
PCT Written Opinion of the International Search Authority, for PCT Application No. PCT/EP2008/004729, dated Dec. 17, 2009, 10 pages.

* cited by examiner

FIG. 9a

|   | 1 | 2 | 3 | 4 | 5 | 6 | 7 | 8 | 9 |
|---|---|---|---|---|---|---|---|---|---|
| 1 | 0 | 0 | 0 | 0 | 0 | 0 | 0 | 0.015 | 0 |
| 2 | 0 | 0 | 0 | 0 | 0 | 0 | 0.026 | 0.09 | 0.015 |
| 3 | 0 | 0 | 0 | 0 | 0 | 0.026 | 0.09 | 0.026 | 0 |
| 4 | 0 | 0 | 0 | 0 | 0.026 | 0.09 | 0.026 | 0 | 0 |
| 5 | 0 | 0 | 0 | 0.026 | 0.09 | 0.026 | 0 | 0 | 0 |
| 6 | 0 | 0 | 0.026 | 0.09 | 0.026 | 0 | 0 | 0 | 0 |
| 7 | 0 | 0.026 | 0.09 | 0.026 | 0 | 0 | 0 | 0 | 0 |
| 8 | 0.015 | 0.09 | 0.026 | 0 | 0 | 0 | 0 | 0 | 0 |
| 9 | 0 | 0.015 | 0 | 0 | 0 | 0 | 0 | 0 | 0 |

FIG. 9b

|   | 1 | 2 | 3 | 4 | 5 | 6 | 7 | 8 | 9 |
|---|---|---|---|---|---|---|---|---|---|
| 1 | 0 | 0 | 0 | 0 | 0 | 0 | 0 | 0.015 | 0 |
| 2 | 0 | 0 | 0 | 0 | 0 | 0 | 0.026 | 0.3 | 0.015 |
| 3 | 0 | 0 | 0 | 0 | 0 | 0.026 | 0.09 | 0.026 | 0 |
| 4 | 0 | 0 | 0 | 0 | 0.026 | 0.09 | 0.026 | 0 | 0 |
| 5 | 0 | 0 | 0 | 0.026 | 0.09 | 0.026 | 0 | 0 | 0 |
| 6 | 0 | 0 | 0.026 | 0.09 | 0.026 | 0 | 0 | 0 | 0 |
| 7 | 0 | 0.026 | 0.09 | 0.026 | 0 | 0 | 0 | 0 | 0 |
| 8 | 0.015 | 0.09 | 0.026 | 0 | 0 | 0 | 0 | 0 | 0 |
| 9 | 0 | 0.015 | 0 | 0 | 0 | 0 | 0 | 0 | 0 |

RGBW SENSOR ARRAY

PRIORITY

This application is a continuation in part (CIP) of co-pending U.S. patent application Ser. No. 11/856,721, filed Sep. 18, 2007, which claim priority to provisional application Ser. No. 60/893,116, filed Mar. 5, 2007. These applications are counterparts to PCT/EP2007/009939. Each of these applications is incorporated by reference.

BACKGROUND

1. Field of the Invention

The present invention relates to an image processing method and apparatus.

2. Description of the Related Art

Sensor arrays for digital cameras exist for capturing color photos. Sensors known as RGBW sensors are used for capturing red, green, blue colors, and for capturing luminance information for multiple pixels of an array of pixels. The red, green and blue pixels include filters such that only certain narrow ranges of wavelengths of incident light are counted. The white pixels capture light of red, green and blue wavelengths, i.e., of a broader range of wavelengths than any of the blue, green and red pixels. Thus, the white pixels are typically brighter than any of the blue, red and green pixels if they are exposed for the same duration.

Noise removal algorithms tend to blur face regions in an undesirable manner. Noise removal algorithms are described at U.S. patent application Ser. Nos. 11/856,721 (FN-204) and 11/861,257 (FN-223) and are hereby incorporated by reference, as are Ser. Nos. 10/985,650, 11/573,713, 11/421,027, 11/673,560, 11/319,766, 11/744,020, 11/753,098, 11/752,925, and 12/137,113, which are assigned to the same assignee as the present application and are hereby incorporated by reference.

Kodak has developed a RGBW color filter pattern differing from the previously known Bayer Color Filter. The RGBW pattern of Kodak is referred to as a Color Filter Array (CFA) 2.0. One half of cells in a RGBW pattern are panchromatic, i.e. sensing all color spectrum (Y component)—usually called white cells. This way more light energy is accumulated in the same amount of time than for color pixels. A Bayer filter uses only ⅓ (~0.33) of color spectrum energy. An RGBW filter uses ⅔ (~0.67) of energy, where ½ comes from white cells and ⅙ from RGB cells.

CFA Array looks something like the following:
WBWG . . .
BWGW . . .
WGWR . . .
RWRW . . .

In this context, the following are incorporated by reference: U.S. Pat. Nos. 7,195,848, 7,180,238, 7,160,573, 7,019,331, 6,863,368, 6,607,873, 6,602,656, 6,599,668, 6,555,278, 6,387,577, 6,365,304, 6,330,029, 6,326,108, 6,297,071, 6,114,075, 5,981,112, 5,889,554, 5,889,277, 5,756,240, 5,756,239, 5,747,199, 5,686,383, 5,599,766, 5,510,215, 5,374,956, and 5,251,019.

Two source images nominally of the same scene may be used to produce a single target image of better quality or higher resolution than either of the source images.

In super-resolution, multiple differently exposed lower resolution images can be combined to produce a single high resolution image of a scene, for example, as disclosed in "High-Resolution Image Reconstruction from Multiple Differently Exposed Images", Gunturk et al., IEEE Signal Processing Letters, Vol. 13, No. 4, April 2006; or "Optimizing and Learning for Super-resolution", Lyndsey Pickup et al, BMVC 2006, 4-7 Sep. 2006, Edinburgh, UK, hereby incorporated by reference. However, in super-resolution, blurring of the individual source images either because of camera or subject motion are usually not of concern before the combination of the source images.

U.S. Pat. No. 7,072,525, incorporated by reference, discloses adaptive filtering of a target version of an image that has been produced by processing an original version of the image to mitigate the effects of processing including adaptive gain noise, up-sampling artifacts or compression artifacts.

US published applications 2006/0098890, 2007/0058073, 2006/0098237, 2006/0098891, European patent EP1779322B1, and PCT Application No. PCT/EP2005/011011 (Ref: FN109), each hereby incorporated by reference, describe uses of information from one or more presumed-sharp short exposure time (SET) preview images to calculate a motion function for a fully exposed higher resolution main image to assist in the de-blurring of the main image.

Indeed many other documents, including US 2006/0187308, Suk Hwan Lim et al.; and "Image Deblurring with Blurred/Noisy Image Pairs", Lu Yuan et al, SIGGRAPH07, Aug. 5-9, 2007, San Diego, Calif. are directed towards attempting to calculate a blur function in the main image using a second reference image before de-blurring the main image.

Other approaches, such as disclosed in US2006/0017837 have involved selecting information from two or more images, having varying exposure times, to reconstruct a target image where image information is selected from zones with high image details in SET images and from zones with low image details in longer exposure time images.

SUMMARY OF THE INVENTION

A color filter enhancement method is provided for a portable digital image acquisition device. The method includes digitally exposing color pixels of a color sensor array for a first digital exposure duration. White pixels of a color sensor array are digitally exposed for a second digital exposure time shorter than the first digital exposure duration. A color filter enhanced digital image is generated using data from both the color pixels exposed for the first digital exposure duration and the white pixels exposed for the second digital exposure duration shorter than the first digital exposure duration. The color filter enhanced digital image and/or a further processed version is stored, transmitted, communicated, displayed, and/or projected.

The second digital exposure time may be less than half of the first digital exposure time, for example, it may be approximately a third of the first digital exposure time.

The digitally exposing of the color pixels and the white pixels for different exposure times may include clocking the color pixels and the white pixels independently.

The digitally-exposing of the color pixels and the white pixels for different exposure times may involve including sensor data over different temporal ranges. The different temporal ranges may be overlapping. A first temporal range corresponding to the digitally-exposing of the color pixels may include an entire second temporal range corresponding to the digitally-exposing of the white pixels.

The color pixels may include greater motion blurring effect than the white pixels due to the color pixels being digitally-exposed for a longer duration than the white pixels. The method may further include compensating blurring in the color pixels using less-blurred data from the white pixels.

The color sensor array may include a CMOS-based sensor.

One or more processor-readable media are also provided that have code embedded therein for programming the processor to perform a color filter enhancement method in accordance with any of the methods described herein.

A portable digital image acquisition device is also provided including optics and a color sensor array for acquiring a color digital image, a processor, and one or more processor-readable media having code embedded therein for programming the processor to perform a color filter enhancement method that comprises any of the methods described herein.

BRIEF DESCRIPTIONS OF THE DRAWINGS

Several embodiments will now be described, by way of example, with reference to the accompanying drawings, in which.

Figure 5A:
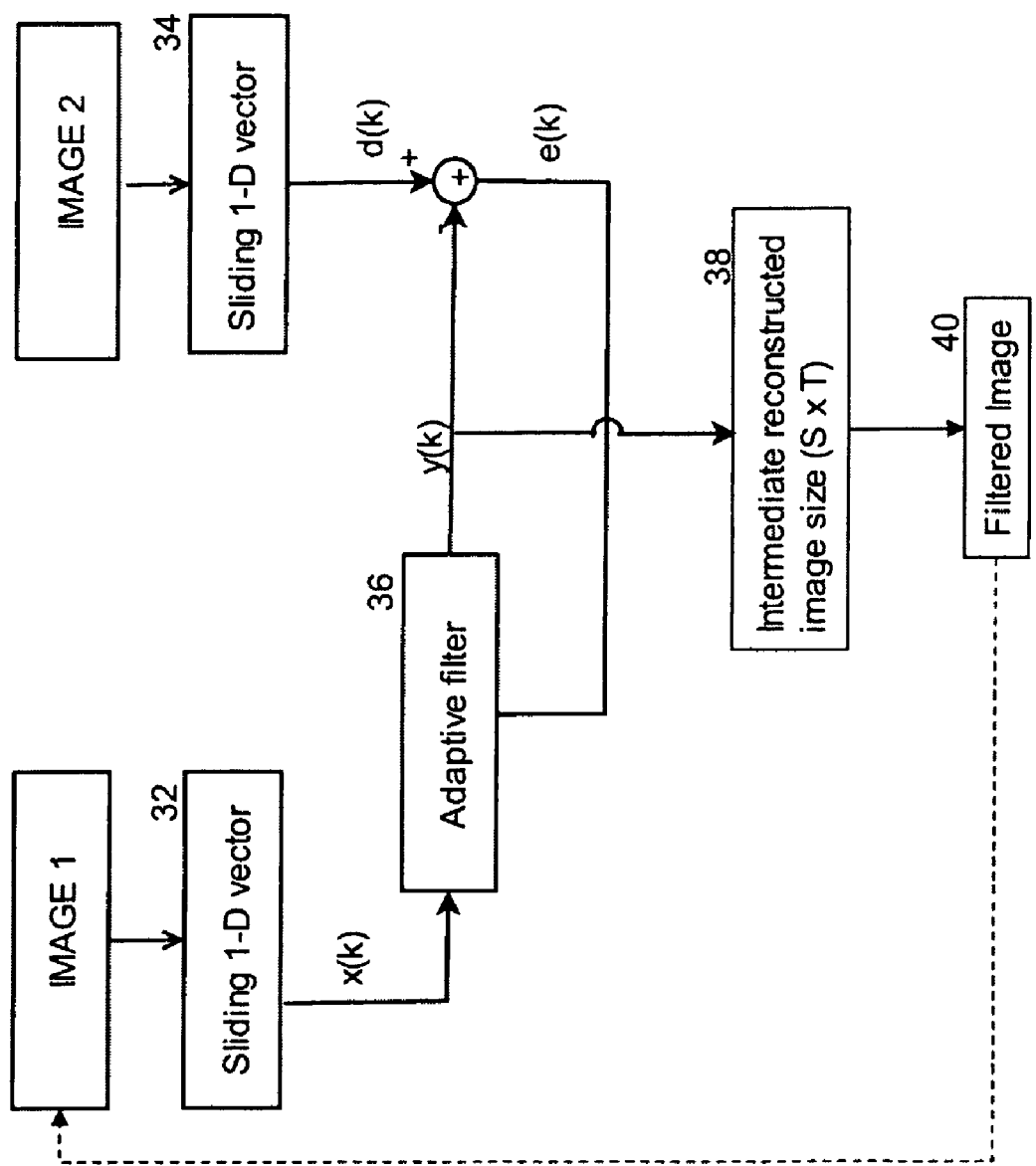
Figure 5B:
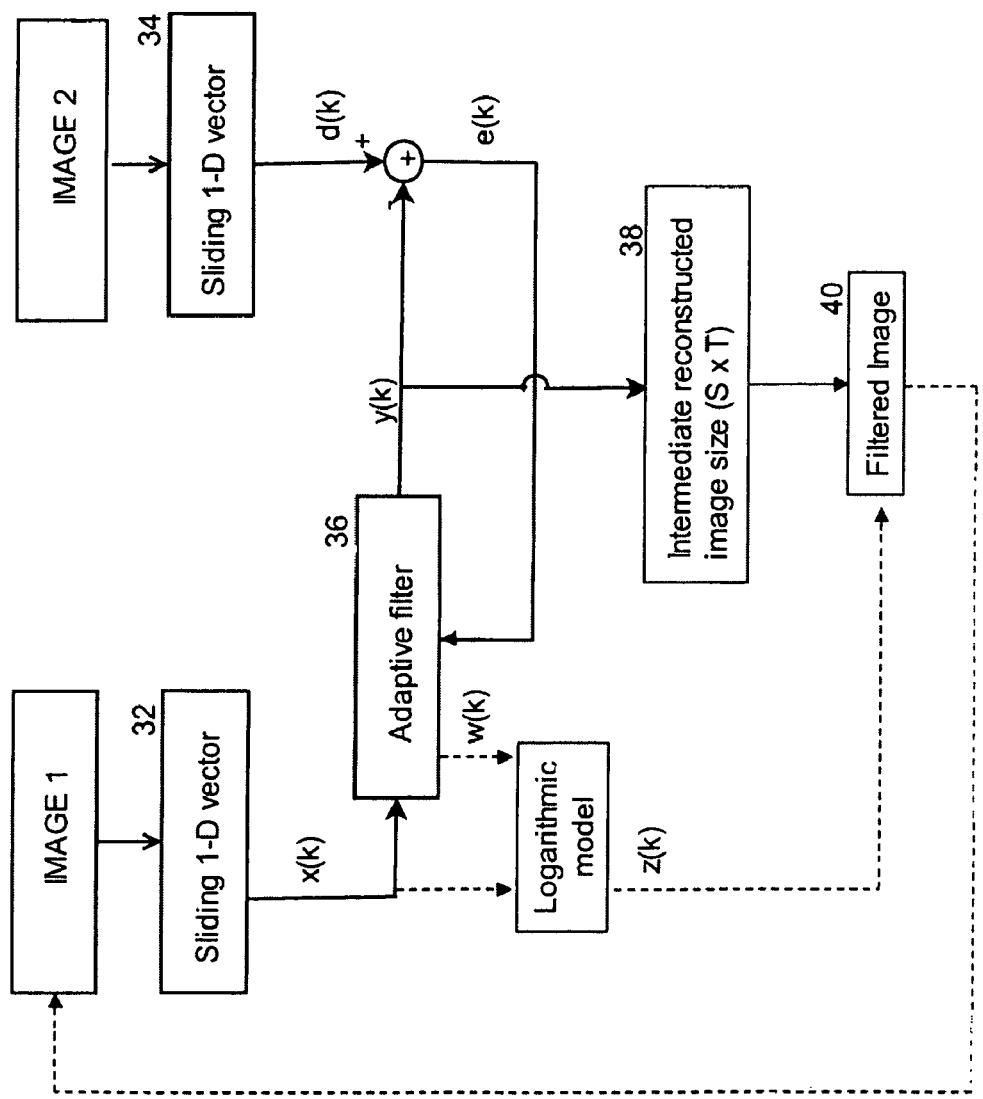
Figure 6:
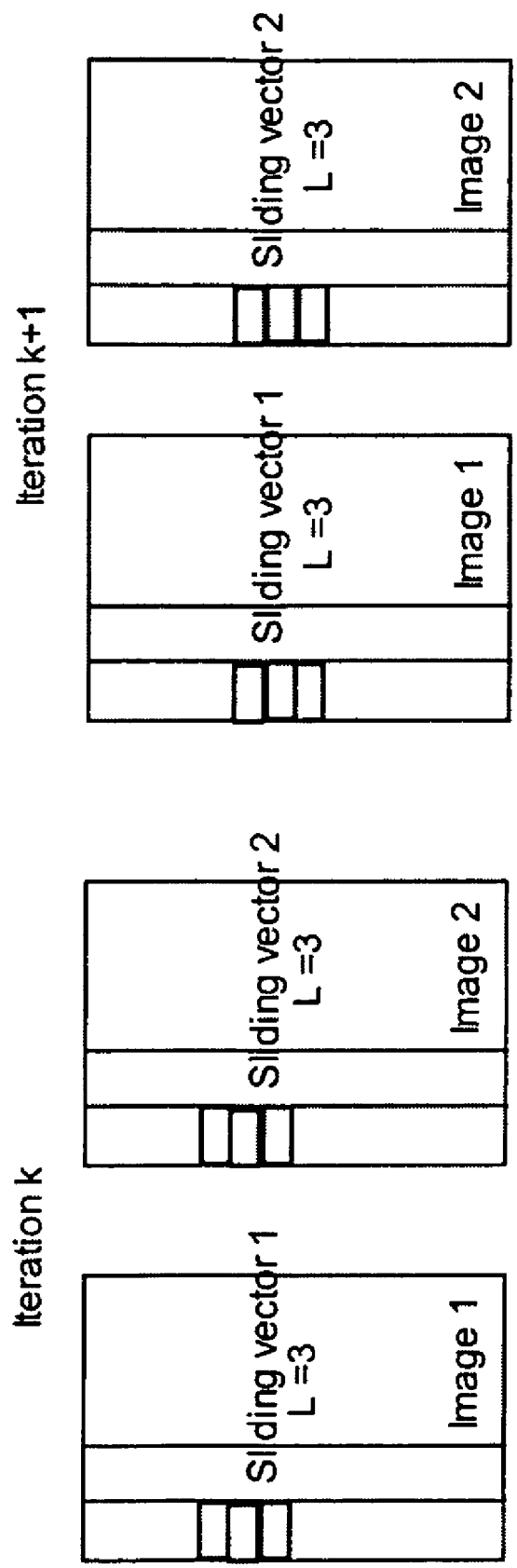
Figure 7:
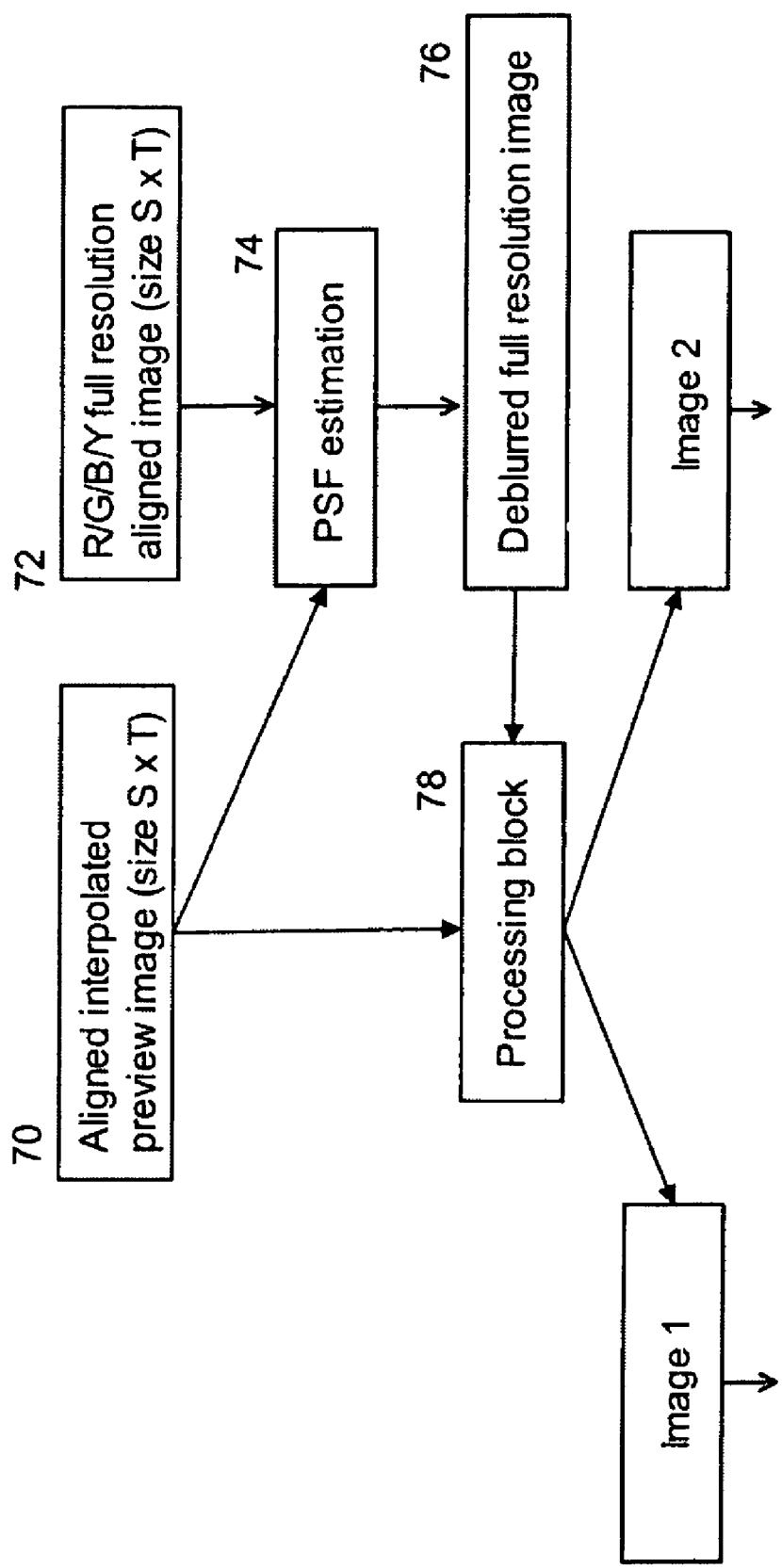
Figure 8:
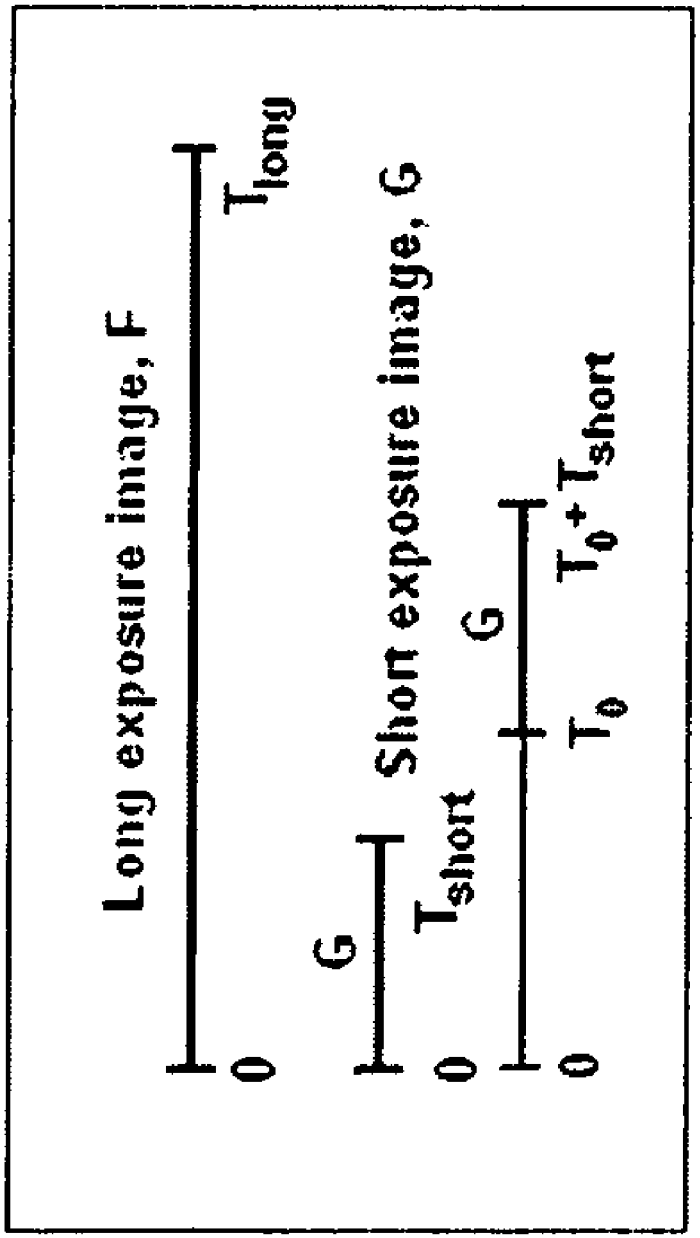
Figure 10:
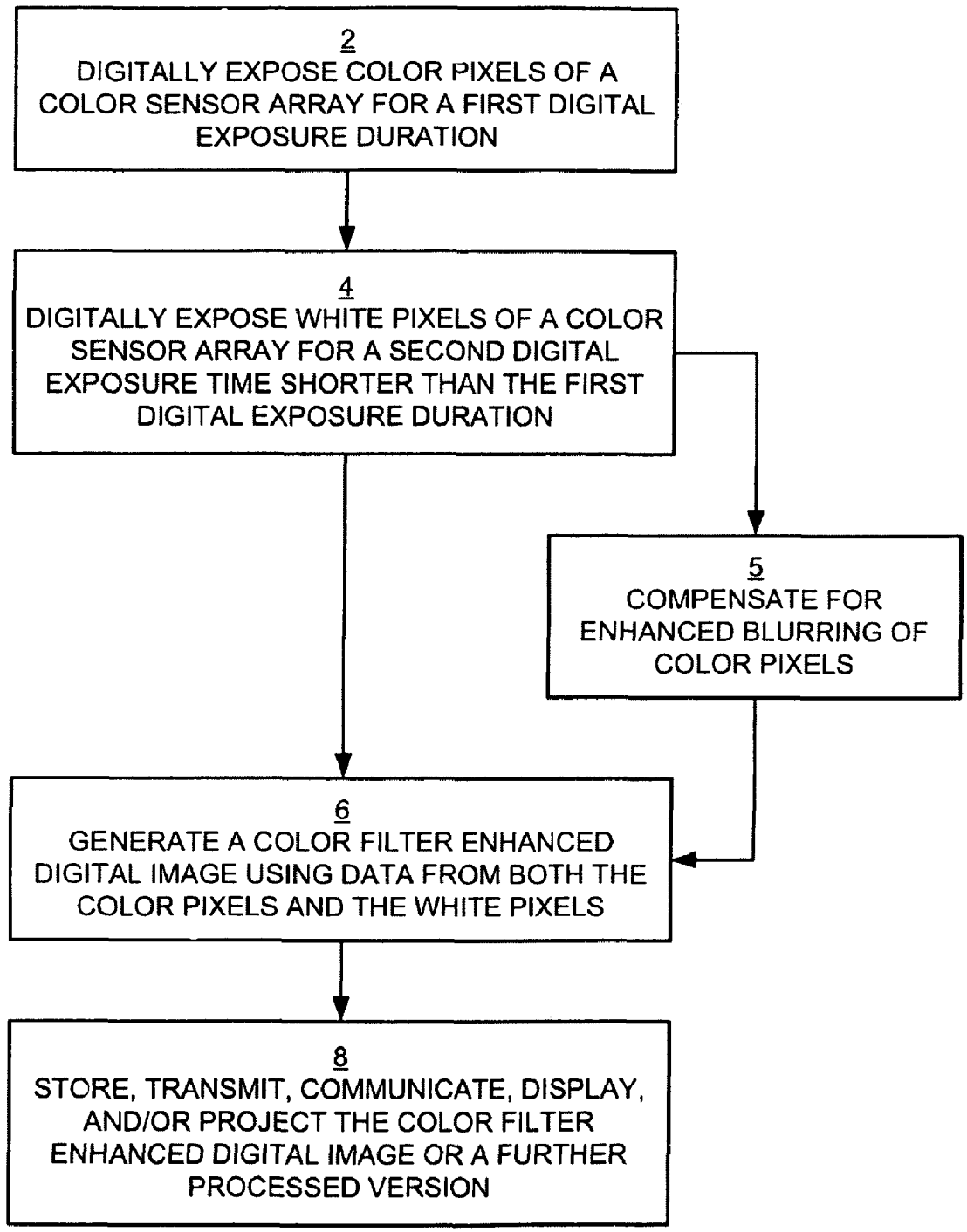
Figure 11:
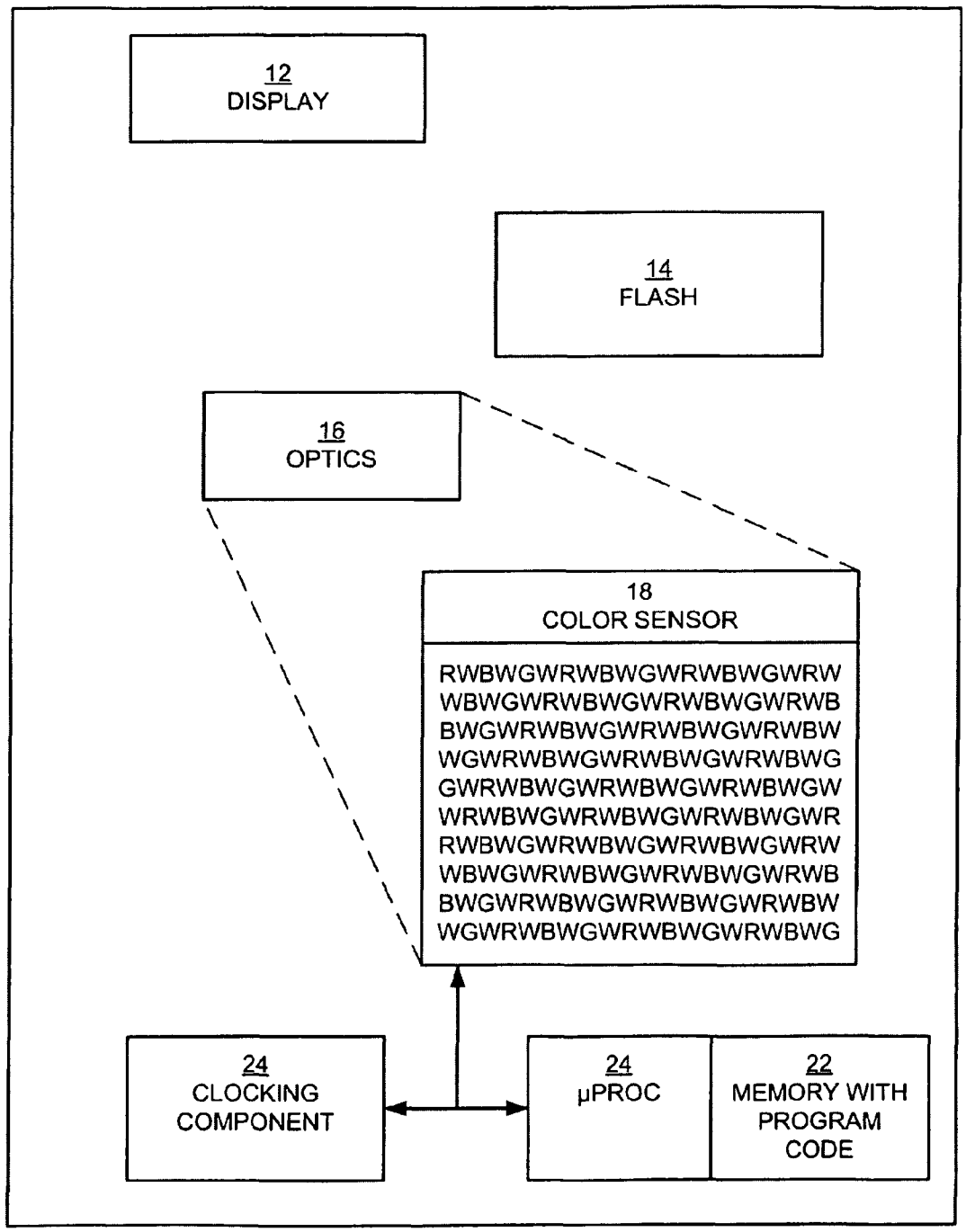

FIGS. 5(a) and (b) illustrate in more detail the adaptive filtering of images according to two variants of the first embodiment of the invention;

FIG. 6 illustrates a sliding vector employed in the filtering of FIG. 5 at successive iterations for L=3;

FIG. 7 is a block diagram illustrating the processing of images prior to adaptive filtering according to a second embodiment of the present invention;

FIG. 8 shows the timing involved in acquiring two images for use in a further embodiment of the present invention;

FIGS. 9(a)-9(e) shows some image data produced during the image acquisition of FIG. 8;

FIG. 10 is a block diagram illustrating a method of color filter enhancement for a portable digital image acquisition device in accordance with certain embodiments; and FIG. 11 is a block diagram illustrating a portable digital image acquisition device with color filter enhancement in accordance with certain embodiments.

DETAILED DESCRIPTIONS OF THE EMBODIMENTS

Improved methods are described of combining a sharp image and a blurred image of differing resolution and exposure to produce a relatively high resolution, fully exposed and relatively sharp image.

Figure 1:
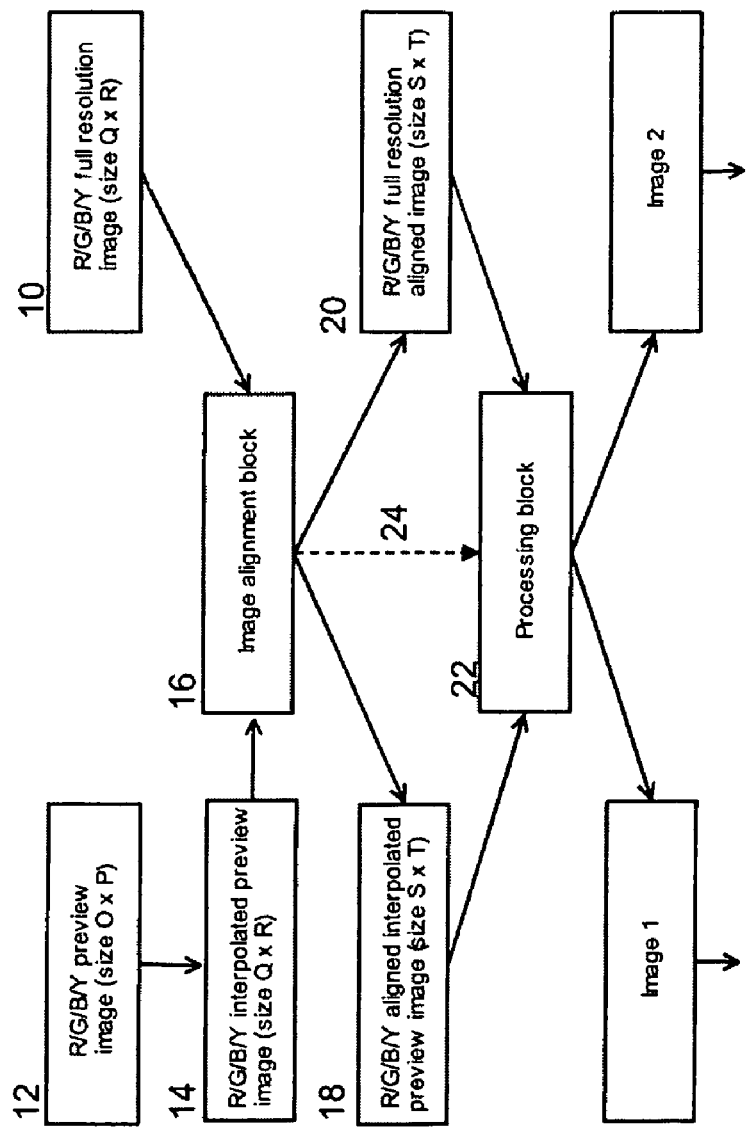
FIG. 1 is a block diagram illustrating the processing of images prior to adaptive filtering according to a first embodiment of the present invention.

Referring now to FIG. 1, in accordance with certain embodiments, a well-exposed blurred relatively low resolution image 12 and a sharp but under-exposed full resolution image 10 are available for processing with a view to combining the images to produce an improved quality full resolution image.

The size of the lower resolution image 12 is O×P and the size of the under-exposed full resolution image 10 is Q×R, with O<Q and P<R.

Where the images are acquired in a digital image acquisition device such as a digital stills camera, camera phone or digital video camera, the lower resolution image 12 may be a preview image of a scene acquired soon before or after the acquisition of a main image comprising the full resolution image 10, with the dimensions of the preview and full resolution images depending on the camera type and settings. For example, the preview size can be 320×240 (O=320; P=240) and the full resolution image can be much bigger (e.g. Q=3648; R=2736).

In accordance with certain embodiments, adaptive filtering (described in more detail later) is applied to the (possibly pre-processed) source images 10, 12 to produce an improved filtered image. Adaptive filtering requires an input image (referred to in the present specification as x(k)) and a desired image (referred to in the present specification as d(k)) of the same size, with the resultant filtered image (referred to in the present specification as y(k)) having the same size as both input and desired images.

As such, in one embodiment, the preview image is interpolated to the size Q×R of the full resolution image.

It will be seen that in interpolating the preview image, a misalignment between the interpolated image 14 and the full resolution image might exist. As such, in this embodiment, the images are aligned 16 to produce an aligned interpolated preview image 18 and an aligned full resolution image 20. Any known image alignment procedure can be used, for example, as described in Kuglin C D., Hines D C. "The phase correlation image alignment method", Proc. Int. Conf Cybernetics and Society, IEEE, Bucharest, Romania, September 1975, pp. 163-165, hereby incorporated by reference.

Other possible image registration methods are surveyed in "Image registration methods: a survey", Image and Vision Computing 21 (2003), 977-1000, Barbara Zitova and Jan Flusser, hereby incorporated by reference.

Alternatively, the displacements between the images 10 and 12/14 can be measured if camera sensors producing such a measure are available.

In any case, either before or during alignment, the full resolution image can be down-sampled to an intermediate size S×T with the preview image being interpolated accordingly to produce the input and desired images of the required resolution, so that after alignment 16, the size of the aligned interpolated image and the aligned full resolution image will be S×T (S≦Q, T≦R).

These images are now subjected to further processing 22 to compute the input and desired images (IMAGE 1 and IMAGE 2) to be used in adaptive filtering after a decision is made based on the displacement value(s) provided from image alignment 16 as indicated by the line 24.

In real situations, there may be relatively large differences between the images 10, 14, with one image being severely blurred and the other one being under-exposed. As such, alignment may fail to give the right displacement between images.

If the displacement values are lower than a specified number of pixels (e.g. 20), then the full resolution aligned image 20 is used as IMAGE 1 and the aligned interpolated preview image 18 is used as IMAGE 2.

Otherwise, if the displacement values are higher than the specified number of pixels, several alternatives are possible for IMAGE 2, although in general these involve obtaining IMAGE 2 by combining the interpolated preview image 14 and the full resolution image 10 in one of a number of manners.

Figure 2:
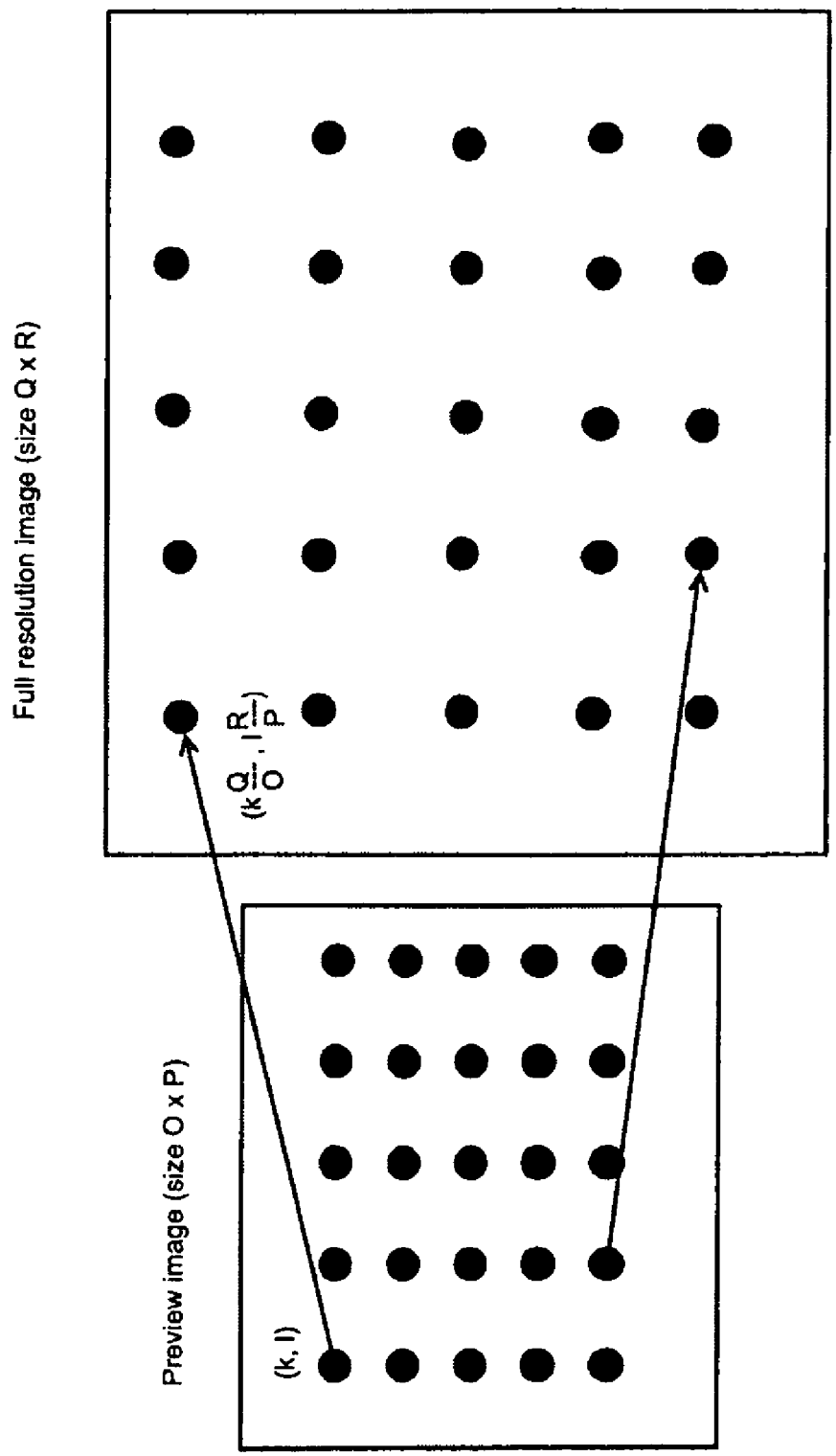
FIG. 2 illustrates corresponding grid points from a preview and a full resolution image used in the processing of FIG. 1.

In a first implementation, we compute two coefficients $c_1$ and $c_2$ and the pixel values of IMAGE 2 are obtained by multiplying the pixel values of the full resolution image 10 with $c_1$ and adding $c_2$. These coefficients are computed using a linear regression and a common form of linear regression is least square fitting (G. H. Golub and C. F. Van Loan, Matrix Computations. John Hopkins University Press, Baltimore, Md., 3rd edition, 1996), hereby incorporated by reference. Referring to FIG. 2, a grid comprising for example 25 points is chosen from the preview image 12 and the corresponding 25 grid points from the full resolution image 10. If one pixel of the preview image has the coordinates (k,l), the corresponding chosen pixel from the full resolution image has the coordinates $$\left(\left(k\cdot\frac{Q}{O}, l\cdot\frac{R}{P}\right)\right).$$

Therefore we obtain two 5×5 matrices, $M_1$ that corresponds to the pixel values chosen from the preview image and $M_2$ that corresponds to the pixel values chosen from the full resolution image. Two vectors are obtained from the pixel values of these matrices by column-wise ordering of $M_1$ ($a=(a_i)$ and $M_2$ $b=(b_i)$). We therefore have pairs of data $(a_i,b_i)$ for i=1, 2, ..., n, where n=25 is the total number of grid points from each image. We define the matrix $$V = \begin{pmatrix} a_1 1 \\ a_2 1 \\ \\ a_n 1 \end{pmatrix}.$$

The coefficient vector $c=[c_1\ c_2]$ is obtained by solving the linear system $V^T V C = V^T b$. The linear system can be solved with any known method.

Another alternative is to amplify the pixels of the under-exposed image 10 with the ratio of average values of the 25 grid points of both images 10, 12 and rescale within the [0-255] interval for use as IMAGE 2.

In a still further alternative, IMAGE 2 is obtained by combining the amplitude spectrum of the interpolated blurred preview image 14 and the phase of the under-exposed full resolution image 10. As such, IMAGE 2 will be slightly deblurred, with some color artifacts, although it will be aligned with the under-exposed image 10. This should produce relatively fewer artifacts in the final image produced by adaptive filtering.

Alternatively, instead of computing FFTs on full resolution images to determine phase values, an intermediate image at preview resolution can be computed by combining the amplitude spectrum of the blurred image 12 and the phase of a reduced sized version of the under-exposed image 10. This can then be interpolated to produce IMAGE 2.

Another possibility is to use as IMAGE 2, a weighted combination of image 20 and image 18, e.g. 0.1*(Image 18)+0.9*(Image 20). This can be used if the preview image 12 has large saturated areas.

In any case, once the processing 22 is complete, two images of similar size are available for adaptive filtering 30. See FIGS. 3-4 in this context.

Figure 3:
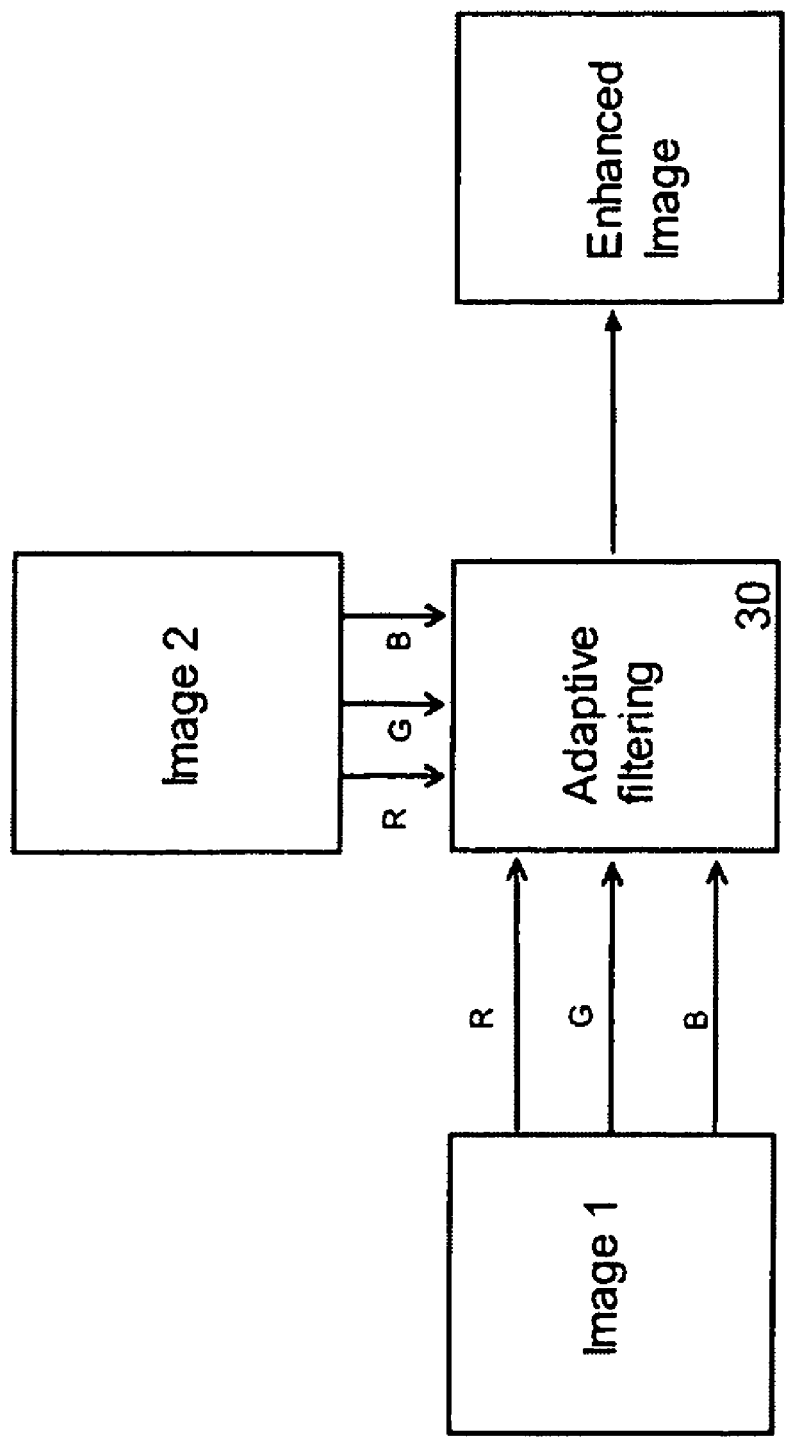
FIG. 3 illustrates the adaptive filtering of images in R/G/B color space according to one implementation of the present invention.
Figure 4:
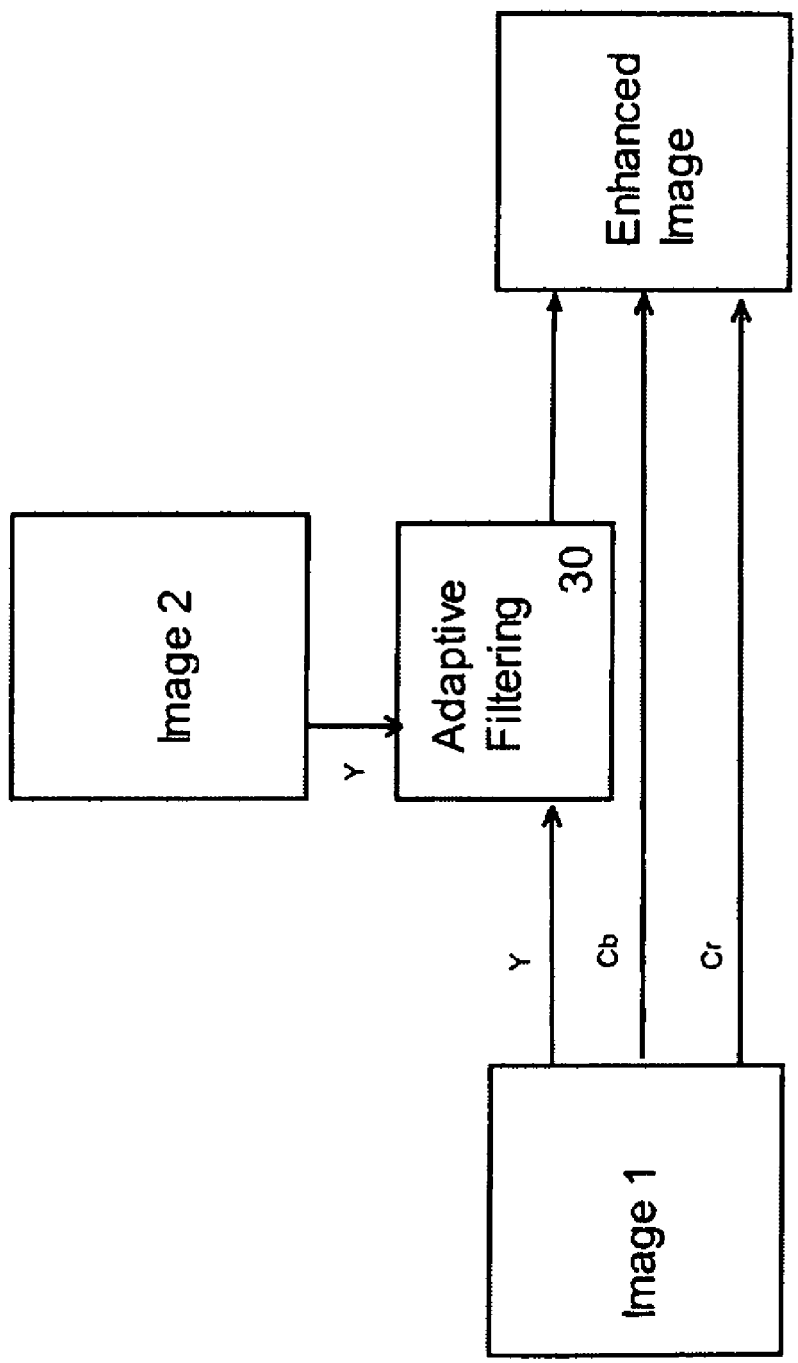
FIG. 4 illustrates the adaptive filtering of images in YCbCr color space according to another implementation of the present invention.

In a first implementation, the input and desired images are in RGB color space, FIG. 3, whereas in another implementation the input and desired images are in YCC space, FIG. 4. For the RGB case, one color plane (e.g. G plane) is selected from both images and the computed filter coefficients from adaptive filtering are used to update the pixel values for all color planes. The filter coefficients w(k) are obtained at each iteration of the filter 36. The updated pixel value for all color planes will be $y_G(k)=w(k)\cdot x_G(k)$, $y_R(k)=w(k)\cdot x_R(k)$, $y_B(k)=w(k)\cdot x_B(k)$, where $x_R(k)$, $x_G(k)$, $x_B(k)$ are the sliding vectors 32 for the R, G, B planes respectively. This provides a solution of reduced numerical complexity vis-à-vis filtering all three color planes.

In the YCC case, the Y plane is selected with the Cb and Cr planes being left unchanged.

Referring now to FIG. 5(a), where the adaptive filtering of FIGS. 3 and 4 is shown in more detail. Two sliding one-dimensional vectors 32, 34 with the dimension L are created, L being the length of the adaptive filter. Within the adaptive filter, the input signal x(k) is the first vector signal 32, while the desired signal d(k) is second vector 34.

In the simplest implementation, L=1 and this can be used if the original image acquisition device can provide good quality under-exposed pictures with a low exposure time. Where the acquisition device produces low quality and noisy under-exposed images, a longer filter length L should be chosen (e.g. 2 or 3 coefficients).

The sliding vectors 32, 34 are obtained from the columns of the image matrices, as illustrated at FIG. 6. The vectors scan both matrices, column by column and with each iteration of the adaptive filter, the following pixel value is added to the vector and the trailing pixel value is discarded.

When the vectors 32, 34 are combined in the adaptive filter 36, the most recent pixel value added to the first sliding vector 32 is updated. In the preferred embodiment, the updated pixel is the dot product of the filter coefficients and the L pixel values of the first vector. Any adaptive algorithm (Least Mean Square based, Recursive Least Square based) can be applied and many such algorithms can be found in S. Haykin, "Adaptive filter theory", Prentice Hall, 1996. Preferably, the sign-data LMS described in Hayes, M, Statistical Digital Signal Processing and Modeling, New York, Wiley, 1996, incorporated by reference, is employed.

The formulae are:

$$x(k)=[x(k),x(k-1)\ldots x(k-L+1)],$$

$$w(k)=[w(k),w(k-1)\ldots w(k-L+1)],$$

$$y(k)=w(k)\cdot x(k),$$

$$e(k)=d(k)-y(k),$$

$$w(k+1)=w(k)+\mu(k)\cdot e(k)\cdot\text{sign}(x(k))=w(k)+\mu(k)\cdot e(k),$$

where
w(k) are the filter coefficients calculated within the filter 36,
μ(k) is the step size (fixed or variable),
x(k) is the most recent pixel value(s) of the sliding vector 32 from Image 1 (it has always positive values),
d(k) is the most recent pixel value(s) of the sliding vector 34 from Image 2,
y(k) is the scalar product of the sliding vector 32 and the filter coefficients vector w,
e(k) is the error signal computed as the difference between d(k) and y(k).

Other considered variants were:

$$w(k+1)=w(k)+\mu(k)\cdot e(k)\cdot x(k)\ \text{(standard LMS) or}$$

$$w(k+1)=w(k)+\mu(k)\cdot e(k)/(1+x(k))$$

The term 1+x(k) is used above to avoid the division by zero. Alternatively, the formula:

$$w(k+1) = w(k) + \mu(k) \cdot \frac{e(k)}{x(k)}$$

could be used, with any zero-valued x pixel value replaced with a 1.

In a further variant, the step size μ(k) is variable as follows:

$$\mu(k) = \frac{1-\alpha}{x(k)} \text{ or } \mu(k) = \frac{1-\alpha}{\max(\beta, x(k))}.$$

So, using the above formula:

$$w(k+1)=w(k)+\mu(k)\cdot e(k)\cdot\text{sign}(x(k))=w(k)+\mu(k)\cdot e(k)$$

this gives:

$$w(k) + \frac{1-\alpha}{x(k)}(d(k) - w(k)\cdot x(k)) =$$

$$w(k) + \frac{d(k)}{x(k)} - w(k) - \alpha \cdot \frac{d(k)}{x(k)} + \alpha \cdot w(k) = \alpha \cdot w(k) + (1-\alpha) \cdot \frac{d(k)}{x(k)}$$

If μ(k)=μ=1−α, α very close to 1 (e.g. 0.99999), for L=1, we have $$w(k+1) = w(k) + \mu(k) \cdot \frac{e(k)}{x(k)},$$

with scalars. Therefore, for this particular fixed step size, the sign-data LMS and the previous equation are equivalent.

The β parameter can be used in order to avoid division by zero and to over-amplify any black pixels. β is preferably in the interval [1 ... 10], and preferably in the interval [5 ... 10], particularly if the under-exposed image is too dark. If not, β=1 is enough.

Some thresholds or resetting for the filter coefficients w(k) or output values y(k) can be imposed in order to avoid artifacts in the filtered image 38. An upper threshold, δ, is imposed for the values that can be allowed for the coefficients of w(k) (i.e. $w_i(k)$=δ for any i=1 ... L, if its computed value at iteration k is above δ). A suitable threshold value for the mentioned LMS algorithm, can be chosen as $$\delta = 1 + \frac{\overline{b}}{4 \cdot \overline{a}},$$

where $\overline{b}$ and $\overline{a}$ are the average values of above mentioned vectors b and a respectively. Also, the filter output can be forced to be within the [0 255] interval if uint8 images are used. As can be seen, the updated pixel values y(k) replace the old pixel values x(k) and can be taken into account for the next sliding vectors.

The updated color matrix 38 is completed when the last pixel from the last column has been updated. If filtering has been performed in RGB space, then a final reconstructed image 40 is obtained by concatenating the R/G/B updated matrices. Alternatively, if filtering has been performed in YCC space, the concatenated updated Y plane, i.e. matrix 38, with unchanged Cb and Cr planes of the under-exposed image 10 can be converted back to RGB color space.

The filtering can be repeated with the reconstructed image 40 replacing the under-exposed image, i.e. IMAGE 1.

In this case, adaptive filtering can be performed on the Y plane of an image converted from RGB space, if previous filtering had been performed in RGB space; or alternatively filtering can be performed on an RGB color plane of an image converted from YCC space, if previous filtering had been performed on the Y plane.

It will also be seen that filtering can be operated column wise or row wise. As such, adaptive filtering can be performed first column or row wise and subsequently in the other of column or row wise.

In each case where filtering is repeated, it has been found that the quality of the reconstructed image after two filtering operations is superior than for each individual filtering result.

Referring to FIG. 5(b), in some cases saturation problems might appear in the filtered image, especially when the coefficient $c_1$ has a large value (e.g. when using a very dark under-exposed image and very light blurred image). This saturation can be avoided using, for example, techniques described in Jourlin, M., Pinoli, J. C.: "Logarithmic image processing. the mathematical and physical framework from the representation and processing of transmitted images" Advances in Imaging and Electron Physics 115 (2001) 129-196; or Deng, G., Cahill, L. W., Tobin, G. R.: "The study of logarithmic image processing model and its application to image enhancement". IEEE Trans. on Image Processing 4 (1995) 506-512, hereby incorporated by reference.

Therefore, the pixel value of the filtered image z(k) is generated by the following formula:

$$z(k) = D - D\left(1 - \frac{x(k)}{D}\right)^{w(k)}$$

where D is the maximum permitted value (e.g. 255 for a 8 bit representation of images). The adaptive filter provides the first filter coefficient w(k) computed using the error signal e(k). Another alternative to reduce saturation problems is to reduce the value of the step size μ(k).

Referring now to FIG. 7, in a second embodiment of the invention, an under-exposed relatively-sharp low resolution image and a full resolution blurred image 72 are available. The low resolution image, for example, a preview image as before, is interpolated and aligned with the full resolution image to produce image 70.

A PSF estimation block 74 computes a PSF for the blurred image 72, from the interpolated preview 70 and the full resolution image 72, using any suitable method such as outlined in the introduction.

The blurred 72 image is then deblurred using this estimated PSF to produce a relatively deblurred image 76. Examples of deblurring using a PSF are disclosed in "Deconvolution of Images and Spectra" 2nd. Edition, Academic Press, 1997, edited by Jannson, Peter A. and "Digital Image Restoration", Prentice Hall, 1977 authored by Andrews, H. C. and Hunt, B. R., hereby incorporated by reference.

Prior to adaptive filtering, the average luminance of the interpolated preview image 70 is equalized in processing block 78 with that of the full resolution (relatively) deblurred image 76. Preferably, this comprises a gamma (γ) amplification of the under-exposed image. The exact value of gamma is determined by obtaining a ratio of average luminance ($\overline{Y}$ in YCC format) for the blurred full resolution and the preview image, and then using this ratio as an index for a look-up table to return γ. The deblurred full resolution image 76 is then chosen as IMAGE 2 and the interpolated/aligned/luminance equalized preview image produced by the processing block 78 is chosen as IMAGE 1.

Adaptive filtering is then applied and re-applied if necessary to IMAGE 1 and IMAGE 2 as in the first embodiment. Again when repeating adaptive filtering, the under-exposed image, i.e. IMAGE 1 is replaced with the reconstructed one.

In another embodiment, the quality of the reconstructed image 76 produced by adaptive filtering may not be good enough, especially if the PSF is relatively large. In such cases, de-blurring using the PSF may not be used, because can it introduce significant ringing.

In cases such as this, re-applying adaptive filtering as in the first embodiment can attenuate the blurring artifacts in the original image 72 and improve the quality of the image to some extent.

Again, the adaptive filtering can be performed on Y plane if RGB filtering had been performed previously and on the RGB color space if Y filtering had been performed previously.

Again, filtering can be operated on columns or rows, and sequentially on columns and rows.

It has also been found that the second embodiment is useful, if the ratio between the full resolution image 72 and the preview image sizes is less than three and the preview image is not too noisy. If this is not the case, the filtered image can have a lower quality than that obtained by deblurring the blurred image with a very good PSF estimation such as described in the introduction.

In any of the above embodiments, a single preview image is described as being interpolated to match the resolution of the full resolution image. However, it will also be appreciated that super-resolution of more than 1 preview image, nominally of the same scene, could also be used to generate the interpolated images 14, 70 of the embodiments.

In the above embodiments, the short-exposure time (presumed sharp) image is described as comprising a preview image acquired either soon before or after acquisition of a main high resolution image.

In a further refined embodiment, the two images are acquired within the longer time period of acquisition of the relatively blurred image. In an implementation of this embodiment, an image acquisition device including a CMOS sensor which allows for a non-destructive readout of an image sensor during image acquisition is employed to acquire the images.

A schematic representation of the timing involved in acquiring these images is explained in relation to FIG. 8. For a dark scene, the exposure time $T_{long}$ required to expose the image F properly can result in motion blur caused by hand jitter. Nonetheless, using a non-destructive sensor, it is possible to have an intermediate reading at $T_{short}$ providing an under-exposed (noise prone), but sharp image G.

In certain embodiments, the read-out of the under-exposed image is placed mid-way through the longer exposure period, i.e between $T_0$ and $T_0+T_{short}$. As such, the actual exposing scheme goes as follows:

At t=0 start exposing
At $t=T_0$ take the first readout to obtain G'
At $t=T_0+T_{short}$ take the second readout to obtain G"
The short exposed image is G=G'−G"
At $t=T_{long}$ take the third (last) readout to obtain the well-exposed frame, F.
Reset the image sensor.

This means that statistically, the chances of content differences between the short exposure and the long exposure images G and F are minimized. Again, statistically, it is therefore more likely that the differences are caused only by the motion existing in the period [0, $T_{long}$]. The well exposed picture is blurred by the motion existing in its exposure period, while the other is not moved at all, i.e. the motion blur makes the content differences.

Figure 9:
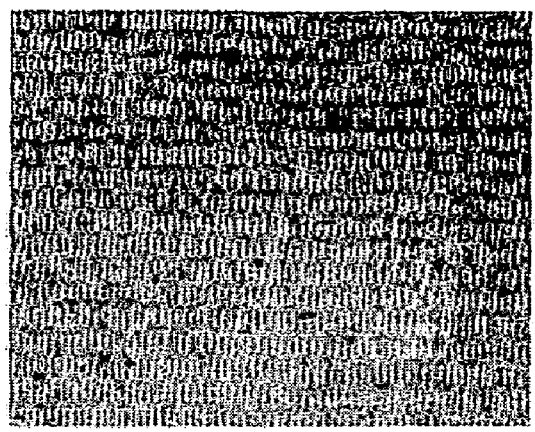
Figure 9:
Figure 9:
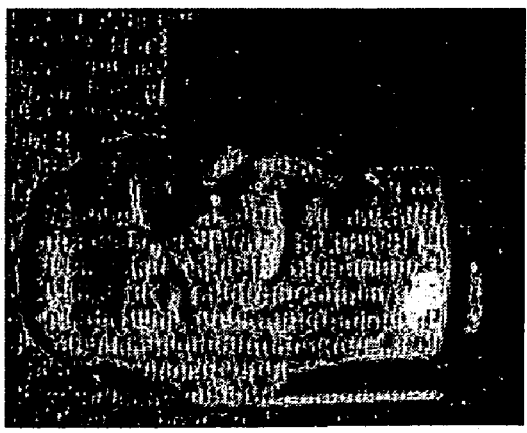

Referring now to FIGS. 9(a)-9(e), a still image of a scene is recorded. The period $T_0$ is chosen to be long enough so that motion appears in the image G' read at time $T_0$, FIG. 9(c). The values of the PSF for this image are shown in FIG. 9(a). From $T_0$ to $T_{short}$ there is not enough time for extra motion to appear. However, the entire interval, [0; $T_0+T_{short}$], is long enough so that the resulting image G", FIG. 9(d), will be blurred as can be seen from the corresponding PSF values of FIG. 9(b). The resulting under-exposed image, G=G"−G', FIG. 9 (e), is not blurred as can be seen from the small difference between the PSF values for the original images G" and G'.

The image G can now be combined with the image F through adaptive filtering as described above and in particular in relation to the second embodiment, luminance enhancement can be performed on the image G before being combined with the image F.

Subsequent to producing the filtered image 40 through one or more steps of adaptive filtering, the filtered image can be subjected to further processing to improve its quality further.

The noise correction of the filtered image can be performed using a modified version of the Lee Least mean square (LLMSE) filter. In the following example, $G_1$ is the filtered image, $G_1^x$ is the convolution of $G_1$ with an X×X uniform averaging kernel; so $G_1^3$ is the convolution of $G_1$ with a 3×3 uniform averaging kernel; and $G_1^7$ is the convolution of $G_1$ with a 7×7 uniform averaging kernel.

The noise cleared picture is: $G_2=\alpha(G_1^x)+(1-\alpha)G_1$
where $$\alpha = \frac{S_n}{S_n + S_F}$$

$S_{G1}$ is the filtered image standard deviation computed for a 5×5 vicinity of a pixel;
$S_F$ is the well-exposed image squared standard deviation computed for a 3×3 vicinity of the corresponding pixel; and
$S_n=|S_F-S_{G1}|$ If $S_F$ is smaller than a predetermined threshold (meaning that the current pixel in a perfectly uniform area) then $G_1^x=G_1^7$ otherwise (in the current pixel neighborhood there is an edge) $G_1^x=G_1^3$. It will therefore be seen that where the variation around a pixel is high, $G_2$ is approximately equal to $G_1$.

As discussed, the under-exposed acquired image has intensities in the lower part of the range (darkness range). The spectral characteristics of the cameras, in this area, differ from those of normally exposed areas. Therefore, the adaptively filtered image, $G_1$ or $G_2$, may have deviations in color depending on whether noise filtering has been applied or not. To compensate for these deviations, a rotation or a translation in the (Cb,Cr) plane can be applied. The parameter values for these operations will depend on the camera and number of exposure stops between the well-exposed and the under-exposed images. One exemplary scheme for color correction in RBG space is as follows:

Compute the average luminance: $(\overline{Y_F}, \overline{Y_{G2}})$
Compute the color averages $(\overline{R_F}, \overline{R_{G2}}, \overline{Gr_F}, \overline{Gr_{G2}} \overline{B_F}, \overline{B_{G2}})$
Correct $G_2$ to obtain $G_3$ as follows:

$$\Delta R=(\overline{R_{G2}}-\overline{Y_{G2}})+(\overline{Y_F}-\overline{R_F}); R_{G3}(i,j)=R_{G2}(i,j)-\Delta R$$

$\Delta Gr = (\overline{Gr_{G2}} - \overline{Y_{G2}}) + (\overline{Y_F} - \overline{Gr_F}); Gr_{G3}(i,j) = Gr_{G2}(i,j) - \Delta Gr$ $\Delta B = (\overline{B_{G2}} - \overline{Y_{G2}}) + (\overline{Y_F} - \overline{B_F}); B_{G3}(i,j) = B_{G2}(i,j) - \Delta B$ with $\forall (i,j) \in [1,M] \times [1,N]$ In an alternative embodiment, an advantageous implementation may use a modified CMOS sensor array. In particular, a form of imaging sensor referred to as the Color Filter Array (CFA) incorporates an alternative arrangement of light sensitive elements to the more conventional Bayer pattern array employed by most standard sensors. Specifically, a CFA sensor incorporates an array of pixels arranged in the pattern:

WBWG ...
BWGW ...
WGWR ...
RWRW ... and so on ....

This contrasts with the more conventional Bayer pattern, viz:

BGBG ...
GRGR ...
BGBG ...
GRGR ...

Note that the CFA arrangement includes special pixels which are sensitive to white light, rather than being specifically tuned to a Red, Green or Blue spectral response. As these white pixels are sensitive to white light, which combines all three color sensitivities, they do tend to charge more rapidly than the conventional pixels which are sensitized to Red, Green or Blue spectral frequencies.

In this alternative embodiment, the sensor array is designed to enable the white pixels which are comingled with the RGB pixels to be clocked independently of those color specific pixels.

Such an arrangement implies that these W pixels are arranged on a separate data bus and are clocked independently of the RGB pixels. Thus, it is possible to extract a "luminance-only" image from the sensor independently of the "chrominance image" provided by the RGB pixels. This involves additional real estate on the sensor IC, but fortunately, as this embodiment may use a smaller image, the density of W pixels employed by the standard CFA sensor may be advantageously reduced. In practice a 4:1 or 8:1 scaling-down of the "luminance image" is adequate and implies that only 1 in 16, or even 1 in 64 pixels should be W pixels.

Now as the luminance-only image obtained from the white pixels will charge more quickly it can be offloaded form the sensor as a fully exposed image about three times faster than the RGB pixels. Where an underexposed image is sufficient the speed of acquisition of this luminance image can be significantly more than an order of magnitude faster than the corresponding RGB image. Further, this luminance-only image derived from the W pixels can be offloaded while the RGB pixels are still charging. This ensures that sharp, underexposed images can be obtained at a time which overlaps the acquisition of the normally exposed, blurred main "chrominance image".

The offloading of the sharp, underexposed image may be timed to co-incide with the mid-point of the acquisition of the normally exposed, blurred color image.

Other advantages of this modified sensor arrangement should also be noted. For example, it is possible to implement an embodiment described in US published patent application US20050041121, hereby incorporated by reference, where a first luminance image is obtained immediately prior to the main RGB acquisition and the actuation of the flash; a second luminance image is obtained during the main RGB acquisition and these two luminance images are used to determine the location of potential red-eye defects. The final determination and correction of red-eye defects can be performed on the main RGB image. This approach has the advantage of eliminating the need to perform alignment between the pair of luminance images and the final RGB image can be enhanced (sharpened) by combining it with one of the two temporally proximate luminance images.

In another embodiment, a face tracking algorithm can be run on the luminance images acquired form such a modified sensor. Such face tracking algorithm may be based on classifier cascades trained on luminance images this approach enables the face tracker to operate directly on the luminance images acquired from the W pixels. Advantageously, where such face tracker algorithm operates using a fixed size classifier chain as described, for example, at U.S. Pat. Nos. 7,315,631, 7,403,643, 7,317,815, 7,269,292, and 7,316,630, and US published application no. 2008/0037840, 2008/0037839 and 2008/0037827, and U.S. application Ser. No. 12/063,089, each assigned to the same assignee and incorporated by reference, the main tracking algorithm for detecting new faces can operate on the luminance images obtained from the sensor, independent of a normal preview stream obtained from the main array of RGB pixels. A refined analysis can be subsequently performed on the corresponding RGB image.

A particular advantage of this configuration arises where low-lighting conditions occur. As noted above the W pixels charge at a rate at least three times faster than the conventional RGB pixels and thus they can obtain better images in low light conditions. This in turn leads to an extension of the lower lighting levels at which a face tracker algorithm can successfully operate and enables higher frame rates to be achieved in extreme conditions.

Now referring to FIGS. 10-11, further embodiments are provided of enhanced methods, hardware and software involving color sensor arrays such as RGBW sensor arrays that include separate color RGB pixels and white W pixels or luminance pixels. In particular, the W pixels tend to saturate or at least are more greatly exposed than the RGB pixels. The RGB pixels receive on average ⅓ of the light intensity of the W pixels, and thus tend to be underexposed or at least less exposed than the W pixels on average by a third and at most more than ⅓. In accordance with certain embodiments, the RGB pixels may be clocked independently of the W pixels and thus can have a longer exposure time.

FIG. 10 illustrates a method in accordance with certain embodiments. Color pixels of a color sensor array are digital exposed for a first digital exposure duration at (2), while white pixels of the array are exposed at (4) for a second digital exposure time shorter than the first digital exposure duration. The second digital exposure time may be half or less than the first digital exposure time, e.g., a third of the first digital exposure time. The exposure times for the red R, blue B, and green G pixels may be the same as or different from each other, for example, in accordance with certain determined color enhancements of the image. The exposure times for any of the red R, blue B, green G and/or white W pixels may vary over the multiple pixels of the sensor array according to spatially-dependent color enhancements, contrast enhancements, and/or intensity enhancements. The pixels may be further adjusted based on other digital image enhancement methods as may be described in other references incorporated by reference herein.

The different digital exposure durations may be provided either by gathering light for different exposure durations, and/or by using data gathered for different periods of time, i.e., while not using other data gathered at times outside a determined period particularly for the white W pixels, and/or by using computed data based on gathered data such as by multiplying or otherwise increasing color pixel data such as by adding data from surrounding pixels in a stand alone approach or in tandem with a dedicated or unrelated smoothing process. Alternatively, a color sensor may be provided that includes a ratio of more or less color pixels to white pixels such as to contribute to intensity balancing and/or certain pixels may be turned off or data gathered from certain pixels may simply not be used in pre-balancing the intensities, or may be discarded in a post-balancing filter. Certain pixels may be blocked, reduced or filtered mechanically, optically, electronically, or digitally such as in accordance with program code, and certain pixels may be likewise enhanced as to the extent of their respective contributions.

The color pixels and the white pixels make be clocked independently or differently such as to provide the different exposure durations. The color pixels and white pixels may be clocked over different temporal ranges which are proximate in time and may or may not overlap. In one example, a temporal range of exposure of the white pixels may lie entirely or partially within a longer temporal range of exposure of the color pixels or a subset thereof, or a temporal range of exposure of the white pixels may just precede or just follow a longer temporal range of exposure of the color pixels or subset thereof.

The color pixels will generally exhibit a greater motion blurring effect than the white pixels due to the color pixels being digitally-exposed for a longer duration than the white pixels. Thus the method of FIG. 10 may include at (5) compensating blurring in the color pixels, for example, by using less-blurred data from the white pixels.

A color filter enhanced digital image is generated at (6) using data from both the color pixels digitally or otherwise exposed for the first digital exposure duration and the white pixels digitally or otherwise exposed for the second digital exposure duration. The color filter enhanced digital image or a further processed version is stored, transmitted, communicated, displayed, and/or projected.

FIG. 11 illustrates in block form a portable digital imaging apparatus such as a portable camera or camera phone. The apparatus may include optional display 12 and flash 14, as well as optics 16 and digital camera sensor 18. Alternatively, methods according to certain embodiments may be applied to film images that are digitized and processed accordingly. The color sensor includes several white pixels W, as well as red pixels R, blur pixels B and red pixels R, although not necessarily in the ratios or positions indicated in the example sensor (18) of FIG. 11. The color sensor array (18) may be or may include a CMOS-based sensor or sensor elements.

The portable digital imaging apparatus include a processor 20 and memory 22 including program code for image processing and handling of image acquisition. The digital image acquisition duration for color pixels RGB is increased compared with that for white pixels W in the sensor array 18, or that for white pixels W is decreased compared to color pixels RGB. There are multiple ways that the apparatus of FIG. 11 can achieve this. In one aspect, an image is exposed to the sensor for the same time period for both color pixels RGB and white pixels W, and then data gathered by the white pixels for only a fraction of that duration is used along with the color pixel data for the entire duration or at least a longer duration than that of the white pixels W. The apparatus may be programmed such that the ratio of the durations used may be proportional to the sensor configuration, such as to depend on the ratio white pixels W to color pixels RGB. For example, the array 18 shows a 1:1 ration of white pixels W to color pixels RGB, but that ratio could be 1:2 or 1:3 or even 2:1 or otherwise. The white pixels W may be the same or different size as the color pixels RGB.

In another aspect, clocking component 24, which can include a single clock or multiple clocks, turns on the white pixels for gathering image data for a different, shorter period than it does for the color pixels. For example, the clocking component 24 may trigger the beginning of gathering data by both the color pixels RGB and the white pixels W at time $t_0$. Then, the clocking component may trigger the stopping of gathering data by the white pixels at time $t_1$. The color pixels RGB would continue to gather data after time $t_1$. Then, the clocking component 24 would trigger the stopping of gathering data by the color pixels RGB at time $t_2$. Alternatively, the clocking component can trigger the color pixels RGB and the white pixels W to begin gathering data at different times $t_0^1$ and $t_0^2$, and may stop the gathering of data by the white pixels W and color pixels RGB at the same time or such that the color pixels RGB are stopped before the white pixels W, and the durations may overlap entirely, partially overlap or not overlap at all. In the latter case, it is desired that the later period of the two data gathering periods closely follows the earlier period, so that the color pixels gather data of substantially the same scene as the white pixels.

The clocking component 24 could be used in the earlier aspect too. The data would be gathered by the white pixels W and color pixels RGB for the same duration between time $t_0$ and $t_1$ according to the clocking component. However, the clocking component would tag other times $t_2$, $t_3$, and perhaps times, between time $t_0$ and $t_1$. Then, only data gathered by the white pixels between times $t_2$ and $t_3$ would be used, while the data gathered by the color pixels RGB between times $t_0$ and $t_1$, or some other duration longer than $t_3$ minus $t_2$, would be used.

In a further aspect, the sensor design may be modified so that the acquisition time can be independently increased for color pixels RGB compared to white pixels W. White pixels W in this aspect would be exposed during a normal period of time (or slightly under exposed) depending on the given scene condition. As color pixels RGB use only ⅓ of light energy comparing to white pixels W, the exposure time for the color pixels RGB would be increased, e.g., by 3 times, without suffering significant over exposure assuming that white pixels W were not overexposed and that the color distribution is approximate equal for the red R, blue B and green G components of the scene.

A factor is that there may be movement of scene objects or sensor shake, jitter or panning. Then, the RGB pixels RGB would be more motion-blurred, e.g. by 3 times, compared with the white pixels W, because the exposure duration of the RGB pixels is so much longer. For this, the RGB blurring can be compensated by a software component that will use the correction from white pixels W. A process described at U.S. application Ser. No. 11/856,721, which is assigned to the same assignee as the present application and is incorporated by reference, may be used to enable the white pixels W in such a sensor to act as a reference image, or one or more dedicated reference images may be used, where the color pixels RGB provide a blurred color image. A single sharp image can be provided by such an array. In the context of adjusting images with motion blur effects, U.S. patent application Ser. Nos. 11/566,180, 10/985,657, 10/985,650, 10/986,562, 11/753,098, 12/137,113, 11/690,836, 11/856,721, 11/764,578, PCT/US2008/061328, and 61/023,774, which are assigned to the same assignee as the present application are also incorporated by reference.

This process may be performed and/or provided according to a dynamic range compression algorithm or similar. This may allow enhancement of dynamic range of an image as two sub-images are acquired with different exposures. Different acquisition durations of white pixels W and color pixels RGB is possible with CMOS based sensors.

Embodiments of the invention enable a full exposure range of a RGBW sensor array to be used. While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the appended claims, and structural and functional equivalents thereof.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

In addition, all references cited above herein, as well as the background, invention summary, abstract and brief description of the drawings, are all incorporated by reference into the Detailed Descriptions of the Embodiments as disclosing alternative embodiments.

The invention claimed is:

1. A color filter enhancement method for a portable digital image acquisition device, comprising:
   (a) digitally exposing color pixels of a color sensor array for a first digital exposure duration;
   (b) digitally exposing white pixels of a color sensor array for a second digital exposure time shorter than the first digital exposure duration;
   (c) generating a color filter enhanced digital image using data from both the color pixels exposed for the first digital exposure duration and the white pixels exposed for the second digital exposure duration, including applying color information using data from the color pixels to a sharp grayscale image generated using data from the white pixels to generate a sharp color image, without de-blurring using motion estimation nor a point spread function (PSF); and
   (d) storing, transmitting, communicating, displaying, or projecting the color filter enhanced digital image or a further processed version, or combinations thereof.

2. The method of claim 1, wherein the second digital exposure time comprises not more than half of the first digital exposure time.

3. The method of claim 2, wherein the second digital exposure time comprises approximately a third of the first digital exposure time.

4. The method of claim 1, wherein the digitally exposing of the color pixels and the white pixels for different exposure times comprises clocking the color pixels and the white pixels independently.

5. The method of claim 1, wherein the digitally-exposing of the color pixels and the white pixels for different exposure times comprises including sensor data over different temporal ranges.

6. The method of claim 5, wherein the different temporal ranges are overlapping.

7. The method of claim 6, wherein a first temporal range corresponding to the digitally-exposing of the color pixels comprises an entire second temporal range corresponding to the digitally-exposing of the white pixels.

8. The method of claim 1, wherein the color pixels comprise greater motion blurring effect than the white pixels due to the color pixels being digitally-exposed for a longer duration than the white pixels, and the method further comprises compensating blurring in the color pixels using less-blurred data from the white pixels.

9. The method of claim 1, wherein the color sensor array comprises a CMOS-based sensor.

10. A portable digital image acquisition device, comprising:
    (a) optics and a color sensor array for acquiring a color digital image;
    (b) a processor;
    (c) one or more processor-readable media having code embedded therein for programming the processor to perform a color filter enhancement method that comprises:
       (i) digitally exposing color pixels of the color sensor array for a first digital exposure duration;
       (ii) digitally exposing white pixels of the color sensor array for a second digital exposure time shorter than the first digital exposure duration;
       (iii) generating a color filter enhanced digital image using data from both the color pixels exposed for the first digital exposure duration and the white pixels exposed for the second digital exposure duration, including applying color information using data from the color pixels to a sharp grayscale image generated using data from the white pixels to generate a sharp color image, without de-blurring using motion estimation nor a point spread function (PSF); and
       (iv) storing, transmitting, communicating, displaying, or projecting the color filter enhanced digital image or a further processed version, or combinations thereof.

11. The device of claim 10, wherein the second digital exposure time comprises not more than half of the first digital exposure time.

12. The device of claim 11, wherein the second digital exposure time comprises approximately a third of the first digital exposure time.

13. The device of claim 10, wherein the digitally exposing of the color pixels and the white pixels for different exposure times comprises clocking the color pixels and the white pixels independently.

14. The device of claim 10, wherein the digitally-exposing of the color pixels and the white pixels for different exposure times comprises including sensor data for over different temporal ranges.

15. The device of claim 14, wherein the different temporal ranges are overlapping.

16. The device of claim 15, wherein a first temporal range corresponding to the digitally-exposing of the color pixels comprises an entire second temporal range corresponding to the digitally-exposing of the white pixels.

17. The device of claim 10, wherein the color pixels comprise greater motion blurring effect than the white pixels due to the color pixels being digitally-exposed for a longer duration than the white pixels, and the method further comprises compensating blurring in the color pixels using less-blurred data from the white pixels.

18. The device of claim 10, wherein the color sensor array comprises a CMOS-based sensor.

19. One or more non-transitory processor-readable media having code embedded therein for programming the processor to perform a color filter enhancement method that comprises:
(a) digitally exposing color pixels of the color sensor array for a first digital exposure duration;
(b) digitally exposing white pixels of the color sensor array for a second digital exposure time shorter than the first digital exposure duration;
(c) generating a color filter enhanced digital image using data from both the color pixels exposed for the first digital exposure duration and the white pixels exposed for the second digital exposure duration, including applying color information using data from the color pixels to a sharp grayscale image generated using data from the white pixels to generate a sharp color image, without de-blurring using motion estimation nor a point spread function (PSF); and
(d) storing, transmitting, communicating, displaying, or projecting the color filter enhanced digital image or a further processed version, or combinations thereof.

20. The one or more media of claim 19, wherein the second digital exposure time comprises not more than half of the first digital exposure time.

21. The one or more media of claim 20, wherein the second digital exposure time comprises approximately a third of the first digital exposure time.

22. The one or more media of claim 19, wherein the digitally exposing of the color pixels and the white pixels for different exposure times comprises clocking the color pixels and the white pixels independently.

23. The one or more media of claim 19, wherein the digitally-exposing of the color pixels and the white pixels for different exposure times comprises including sensor data for over different temporal ranges.

24. The one or more media of claim 23, wherein the different temporal ranges are overlapping.

25. The one or more media of claim 24, wherein a first temporal range corresponding to the digitally-exposing of the color pixels comprises an entire second temporal range corresponding to the digitally-exposing of the white pixels.

26. The one or more media of claim 19, wherein the color pixels comprise greater motion blurring effect than the white pixels due to the color pixels being digitally-exposed for a longer duration than the white pixels, and the method further comprises compensating blurring in the color pixels using less-blurred data from the white pixels.

27. The one or more media of claim 19, wherein the color sensor array comprises a CMOS-based sensor.

* * * * *